(12) United States Patent
Nakazawa

(10) Patent No.: US 8,248,669 B2
(45) Date of Patent: Aug. 21, 2012

(54) IMAGE READING DEVICE AND IMAGE FORMING APPARATUS

(75) Inventor: Masamoto Nakazawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 438 days.

(21) Appl. No.: 12/508,906

(22) Filed: Jul. 24, 2009

(65) Prior Publication Data

US 2010/0027061 A1 Feb. 4, 2010

(30) Foreign Application Priority Data

Jul. 29, 2008 (JP) ................................. 2008-195134
Apr. 8, 2009 (JP) ................................. 2009-094349

(51) Int. Cl.
*H04N 1/40* (2006.01)

(52) U.S. Cl. ......... 358/443; 358/1.1; 358/505; 358/474; 358/445; 455/108

(58) Field of Classification Search .................. 358/445, 358/1.1, 505, 474, 483; 455/108
See application file for complete search history.

(56) References Cited

U.S. PATENT DOCUMENTS

| | | | |
|---|---|---|---|
| 5,191,424 A | 3/1993 | Nohmi et al. | |
| 5,369,406 A | 11/1994 | Hughes | |
| 5,408,113 A * | 4/1995 | Kanno et al. | 257/292 |
| 6,198,349 B1 * | 3/2001 | Kanno et al. | 330/282 |
| 6,426,804 B1 * | 7/2002 | Kanno et al. | 358/445 |
| 7,948,661 B2 * | 5/2011 | Tsukahara et al. | 358/445 |
| 2004/0047007 A1 * | 3/2004 | Kanno | 358/474 |
| 2007/0188638 A1 | 8/2007 | Nakazawa et al. | |
| 2007/0216915 A1 * | 9/2007 | Tsukahara | 358/1.9 |
| 2008/0106748 A1 | 5/2008 | Tsukahara et al. | |

FOREIGN PATENT DOCUMENTS

| | | |
|---|---|---|
| JP | 2005-151296 | 6/2005 |
| JP | 4059500 | 12/2007 |
| JP | 2008-118366 | 5/2008 |

OTHER PUBLICATIONS

Extended European Search Report issued Aug. 12, 2011, in European Patent Application No. 09251901.6.

* cited by examiner

*Primary Examiner* — Twyler Haskins
*Assistant Examiner* — Dennis Dicker
(74) *Attorney, Agent, or Firm* — Oblon, Spivak, McClelland, Maier & Neustadt, L.L.P.

(57) ABSTRACT

An image reading device includes a charge-coupled device that generates and outputs an image signal, a timing generator that outputs a frequency-modulated clock, a modulation signal detector that detects a modulation signal being a signal corresponding to a change in frequency of the clock, an amplitude controller that controls an amplitude of the modulation signal, and a signal combining unit that superimposes the modulation signal after the amplitude is controlled on the image signal.

9 Claims, 31 Drawing Sheets

IMAGE READING DEVICE AND IMAGE FORMING APPARATUS

CROSS-REFERENCE TO RELATED APPLICATIONS

The present application claims priority to and incorporates by reference the entire contents of Japanese Patent Application No. 2008-195134 filed in Japan on Jul. 29, 2008 and Japanese Patent Application No. 2009-094349 filed in Japan on Apr. 8, 2009.

BACKGROUND OF THE INVENTION

1. Field of the Invention

The present invention relates to image reading devices that optically read an image of an original. The present invention relates more particularly to an image reading device that can control a variation in an image level.

2. Description of the Related Art

In association with higher image quality and higher speed required of image forming apparatuses such as digital copiers, higher pixel density and higher speed upon image reading are also required of image reading devices provided in the image forming apparatuses. Digital copiers, facsimiles, and digital multifunction products are the examples of such image forming apparatuses.

FIG. 36 is a block diagram of a signal processing system in a conventional digital copier. Signal processing from reading of an image by a photoelectric conversion device to converting of the image to a digital image signal is implemented in the following manner as shown in FIG. 36.

More particularly, a source oscillation clock generated and output from an oscillator (OSC) 1 is converted to a frequency-modulated clock by a spectrum spread clock generator (SSCG) circuit 2. The frequency-modulated clock is input to a phase locked loop (PLL) circuit 3a in a timing-generation integrated circuit (IC) (TG: timing generator) 3. The PLL circuit 3a generates clocks CCD_CLK and AFE_CLK by multiplying the received clock and outputs the generated clocks CCD_CLK and AFE_CLK to a charge-coupled device (CCD) 4 and a signal processing IC (AFE: analog front-end) 5 respectively as drive clocks. The CCD 4 receives light reflected from an original, converts the light to an electrical signal, and outputs the electrical signal to the AFE 5 through a buffer (EF: emitter follower) 6 and an alternating-current (AC)-coupled capacitor 7. The AFE 5 includes a clamp circuit (CLMP) 5a, a sample hold circuit (SH) 5b, a programmable gain circuit (PGA) 5c, and an analog-to-digital (A/D) converter (ADC) 5d. A zero level (black level) of a received image signal (Vsig) is corrected to an internal reference voltage (Vref) by the CLMP 5a and input to the SH 5b. The received image signal is sample-held by the SH 5b by using the internal reference voltage (Vref), the resulting signal is amplified by the PGA 5c, and the resulting signal is A/D-converted by the ADC 5d. A 10-bit digital image signal (DOUT [9:0]) obtained in this process is output to the next stage.

Speeding up of image reading devices has disadvantageously led to generation of undesired radiation (EMI). The SSCG 2 is typically employed these days to prevent generation of undesired radiation (EMI). The SSCG 2 cyclically modulates the frequency of a received clock signal. More specifically, as shown in FIG. 37, the SSCG 2 is operative to reduce a peak level of radiation noise per unit time from S1 to S2 by applying a frequency spread to the received clock signal.

In the conventional technology, however, because the frequency-modulated clock is used in the CCD 4 and the AFE 5, there is a problem that the image signal varies according to a modulation period of the SSCG 2 (see FIG. 38). If the image signal varies, an offset level of an output signal varies in the CCD 4 and a sample-holding timing varies in the AFE 5. The variation caused by the SSCG 2 is generally asynchronous to a main scanning line, and therefore phases of variations are gradually shifted in order from a first line, a second line, ... , as shown in FIG. 39. As a result, oblique stripes appear in a read image. FIG. 39 is a diagram in which level variations in image signals of the lines are arranged in a sub-scanning direction. In an actual output image, portions of a low image level (dips) become high (dark) in image density, while portions of a high image level (peaks) become low (light) in the image density. Consequently, stripes appear on a straight line connecting the portions of the low image level of the respective lines and on a straight line connecting the portions of the high image level of the respective lines.

Japanese Patent Application Laid-open No. 2008-118366 discloses a technology to prevent generation of the stripes. This technology removes a variation component from an image signal to prevent generation of horizontal stripes. The disclosed image reading device has functions of converting an incident light into an analog image signal by a photoelectric conversion device, digitizing the analog image signal by a analog-to-digital converter, and outputting the digitized image signal. The image reading device includes a unit that drives the photoelectric conversion device using a frequency-modulated clock, and is characterized in that a signal is superimposed on the image signal. Specifically, the signal has an opposite phase and an equal amount of variation to a variation of the analog image signal according to a change in frequency of the clock.

Japanese Patent Application Laid-open No. 2005-151296 also discloses a technology to prevent generation of the stripes.

However, a variation in an image signal level due to SSCG (hereinafter, "variation due to SSCG") occurs as a composite result of variations generated in various elements such as the SSCG, the CCD, the TG (VCO gain in the PLL circuit), the AFE, and drive circuits and circuit patterns of these components. Therefore, the variation due to SSCG can vary greatly from one signal processing system to another; i.e., there is a large individual difference (variation) in the variation level itself. Consequently, in the technology disclosed in Japanese Patent Application Laid-open No. 2008-118366, it is not possible to deal with the variation when the individual difference becomes significant (e.g., when the signal processing systems are produced in large numbers or the like) although the variation can be principally corrected. For example, if correction is performed on a component without the variation due to SSCG, and the variation is thereby worsened rather than being corrected.

SUMMARY OF THE INVENTION

It is an object of the present invention to at least partially solve the problems in the conventional technology.

According to an aspect of the present invention, there is provided an image reading device including a photoelectric conversion device that receives a light reflected from an original and coverts received light to an image signal; a timing generator that outputs a frequency-modulated clock; a modulation signal detector that detects and outputs a modulation signal being a signal corresponding to a change in frequency of the frequency-modulated clock; an amplitude controller that controls an amplitude of the modulation signal output from the modulation signal detector thereby generating an amplitude-controlled modulation signal and outputs the amplitude-controlled modulation signal; and a signal combining unit that superimposes the amplitude-controlled modulation signal on the image signal.

According to another aspect of the present invention, there is provided an image forming apparatus comprising an image reading device. The image reading device including a photoelectric conversion device that receives a light reflected from an original and coverts received light to an image signal; a timing generator that outputs a frequency-modulated clock; a modulation signal detector that detects and outputs a modulation signal being a signal corresponding to a change in frequency of the frequency-modulated clock; an amplitude controller that controls an amplitude of the modulation signal output from the modulation signal detector thereby generating an amplitude-controlled modulation signal and outputs the amplitude-controlled modulation signal; and a signal combining unit that superimposes the amplitude-controlled modulation signal on the image signal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4A to 4D are circuit configurations when a transistor is used for EF, in which FIGS. 4A and 4B depict conventional configurations and FIGS. 4C and 4D depict configurations according to the embodiment;

DETAILED DESCRIPTION OF THE PREFERRED EMBODIMENTS

Figure 1:
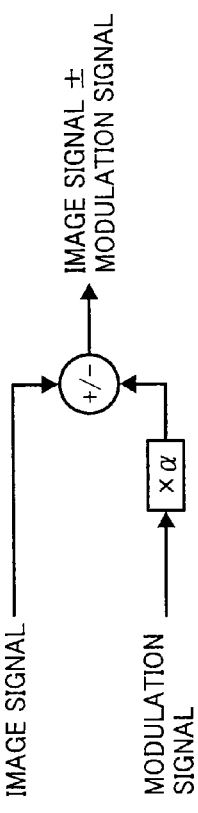
FIG. 1 is a diagram for explaining the concept of the present invention.

Exemplary embodiments of the present invention are explained in detail below with reference to the accompanying drawings. The same reference numerals are assigned to those equivalent to the components in the conventional example, and explanation thereof is omitted.

FIG. 1 is a diagram for explaining the concept of the present invention.

Figure 2:
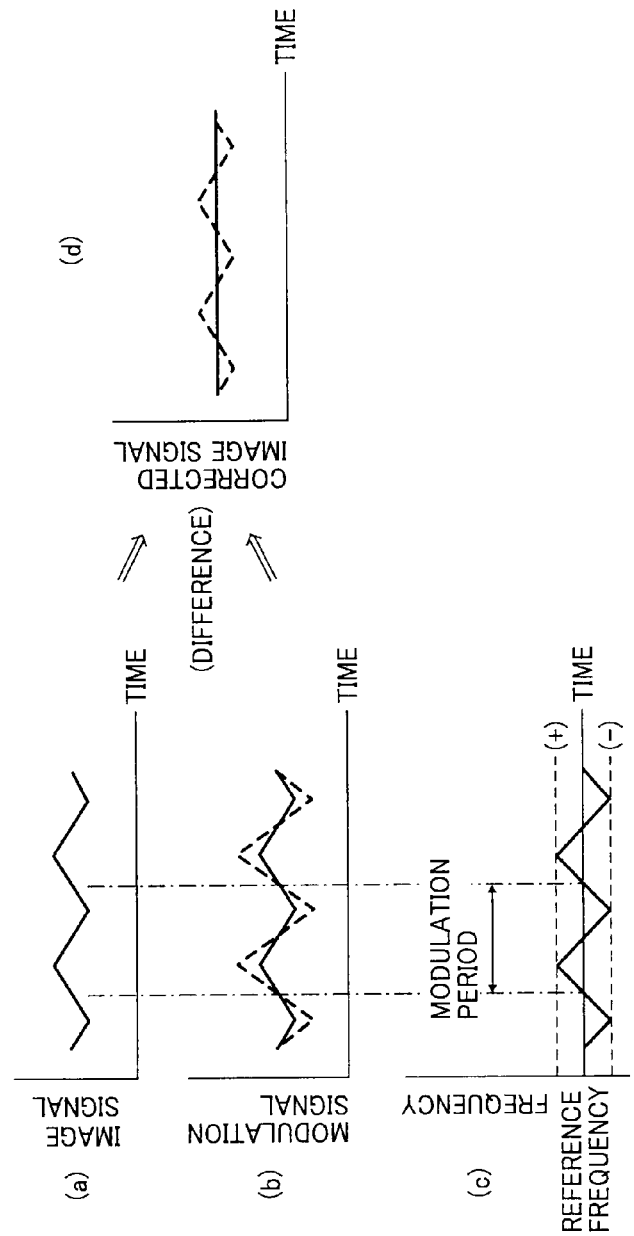
FIG. 2 represents states of waveforms (a) to (d) when a difference between an image signal and a modulation signal is used to correct a variation.

In order to correct the variation of an image signal depending on the modulation profile of the SSCG 2, in the present invention, a signal indicating a modulation profile (hereinafter, "modulation signal") of the SSCG 2 is detected, and a signal whose amplitude is varied ($\alpha$ times) so as to be equivalent to a variation level of the image signal is superimposed on the image signal. FIG. 2 represents states of waveforms (a) to (d) when a difference between the image signal and the modulation signal is used to correct the variation. In an embodiment of the present invention, an amplitude of the modulation signal is caused to coincide with the variation level on the modulation signal that is superimposed on the image signal, and an electric difference between the two signals is calculated or the two signals are combined to correct the variation due to the SSCG 2.

In FIG. 2, (a) represents the image signal that varies due to the SSCG, a dotted line in (b) represents a modulation signal (signal indicating a modulation profile) of the SSCG and a solid line in (b) represents a modulation signal obtained by controlling the amplitude of the modulation signal ($\alpha$ times), and (c) represents a change in frequency due to the SSCG. A solid line in (d) of FIG. 2 represents a variation of the image signal after being corrected (no variation) and a dotted line therein represents a variation of the image signal before being corrected (not corrected) (the variation remains, similarly to (a) of FIG. 2). In (a) and (b) of FIG. 2, vertical-axes represent voltage respectively, which are equivalent to an output of the PLL circuit 3a in FIG. 3, explained later. The waveform (c) of FIG. 2 represents a frequency profile when the frequency is processed by the SSCG, and the vertical-axis thereof represents frequency as explained above.

It should be noted that the frequency profile in (c) of FIG. 2 does not always represent a specific signal, and thus the frequency profile represents a time change of frequencies of a clock output from the SSCG 2 and of all clocks generated in the TG 3 based on the clock. Therefore, in FIG. 3 explained later, the frequency profile corresponds to the output clock of the SSCG 2, the CCD_CLK, and the AFE_CLK and corresponds to all operation clocks in the TG 3. Thus, it can be said that the variation of the image signal is caused by the changes in frequencies of the CCD_CLK and the AFE_CLK.

Figure 3:
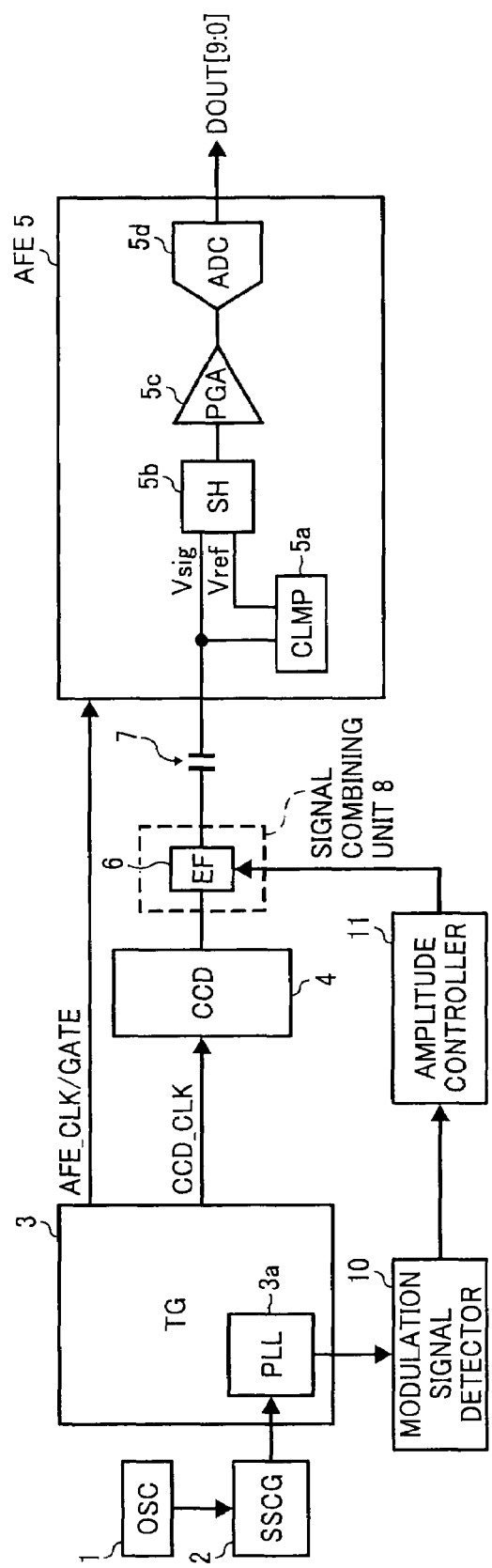
FIG. 3 is a block diagram of a circuit configuration used to correct an output signal of CCD and to superimpose the modulation signal on the image signal according to an embodiment of the present invention.
Figure 36:
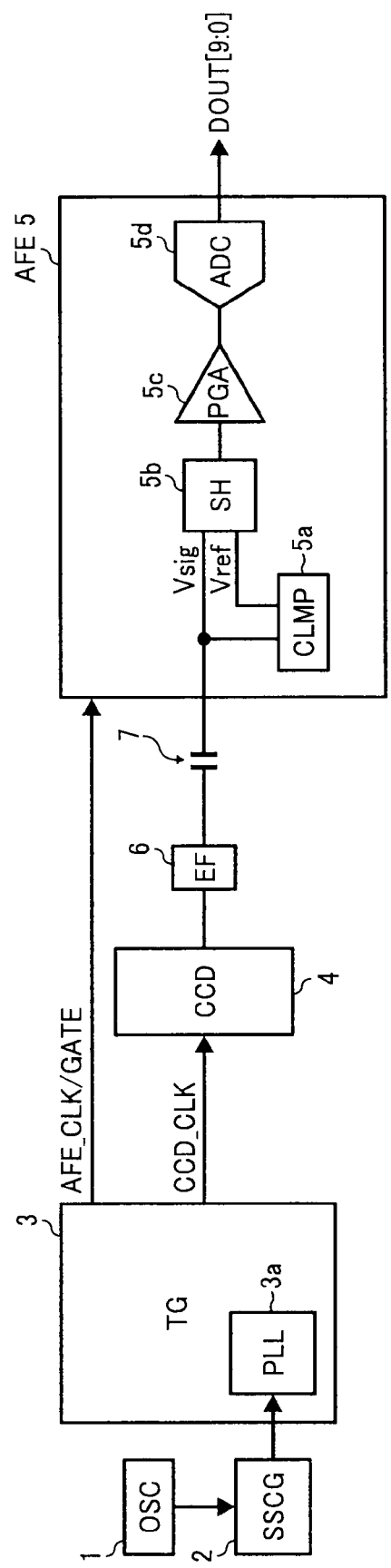
FIG. 36 is the block diagram of the signal processing system in the conventional digital copier.
Figure 37:
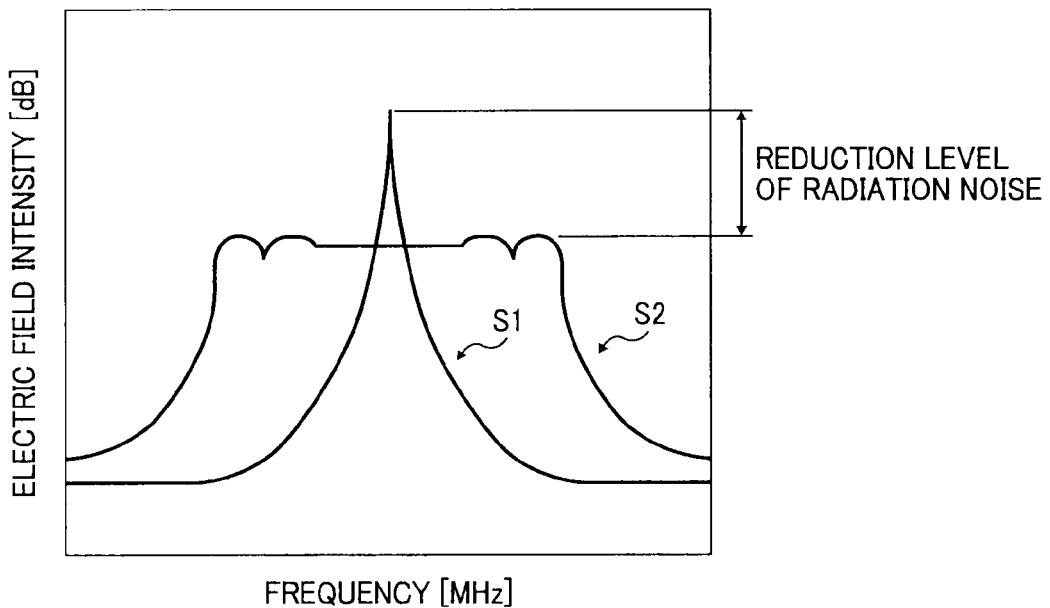
FIG. 37 is a characteristic graph indicating a function of cyclically modulating the frequency of a clock signal of the SSCG.
Figure 38:
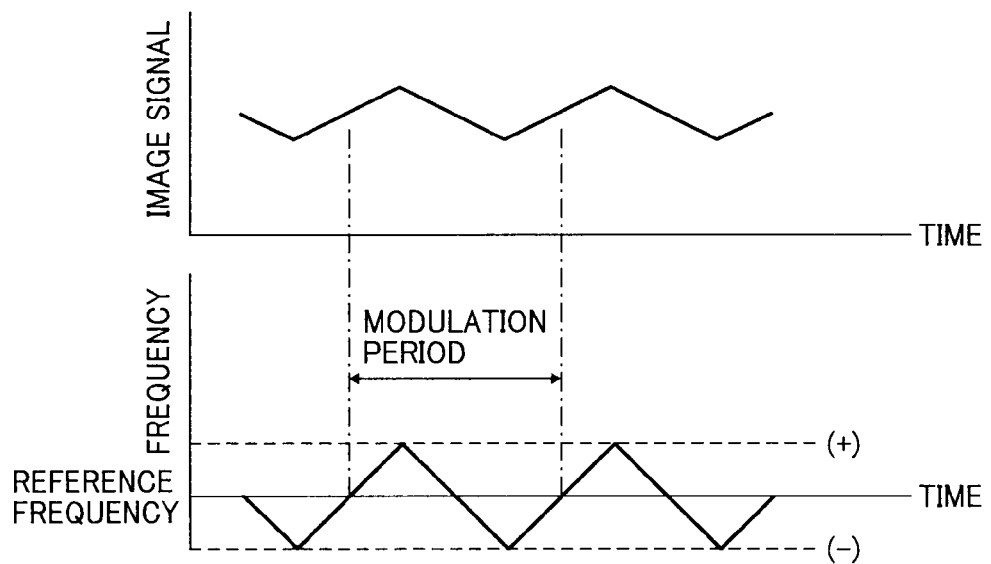
FIG. 38 is a diagram of a state in which the image signal varies according to a modulation period of the SSCG based on the conventional technology.
Figure 39:
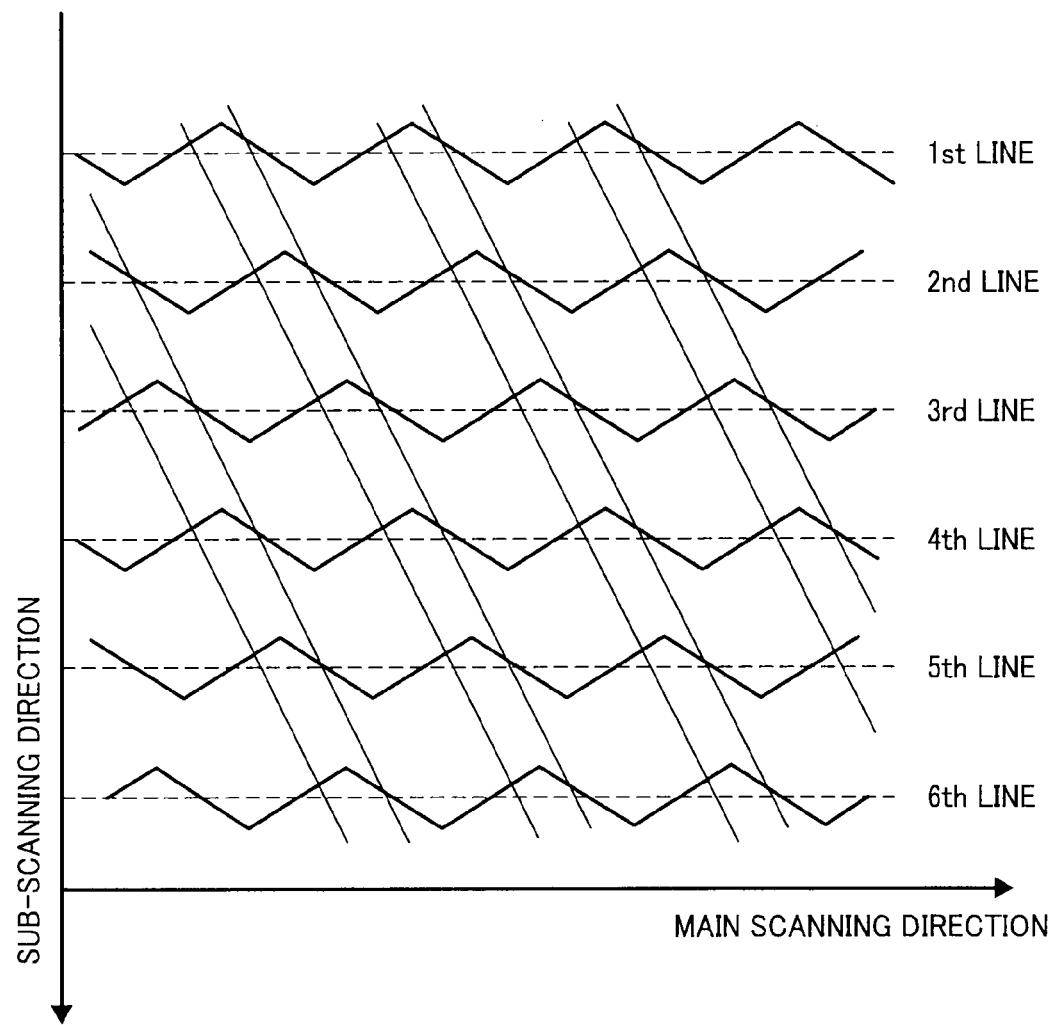
FIG. 39 is a diagram of a state in which oblique stripes appear in a read image based on the conventional technology.

Superimposing the modulation signal on the image signal can be achieved by correcting an output signal of the CCD or correcting the modulation signal with a signal reference potential inside the AFE. FIG. 3 depicts a configuration for implementing the former, in which the EF 6 functions as a signal combining unit 8 that superimposes the modulation signal and the image signal on each other. In the configuration shown in FIG. 3, a modulation signal detector 10 and an amplitude controller 11 are additionally provided to the conventional configuration shown in FIG. 36. The modulation signal detector 10 detects the modulation signal from the PLL circuit 3a and inputs the detected modulation signal to the amplitude controller 11. The amplitude controller 11 performs amplitude control on the received modulation signal and inputs the amplitude-controlled signal to the EF 6. The EF 6 changes a high-side (H-side) or a low-side (L-side) reference potential by the modulation signal and then combines the image signal and the modulation signal, which results in the cancelation of the variation. Alternatively, the same effect can be obtained by inputting the modulation signal to a power supply of the CCD 4. In the configuration shown in FIG. 3, the detected modulation signal is input to the amplitude controller 11 and the amplitude-controlled signal is input to the EF 6. However, a specific method of controlling (changing) the amplitude and a method of automatically performing the control are explained later.

Figure 4A:
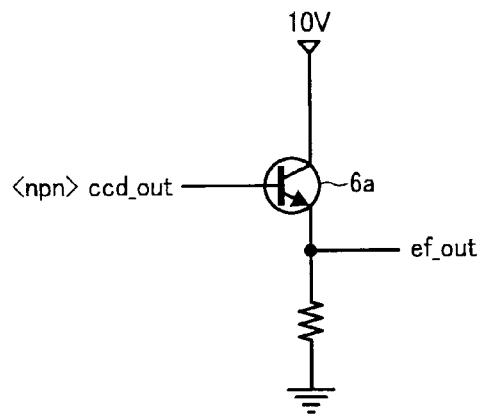
Figure 4B:
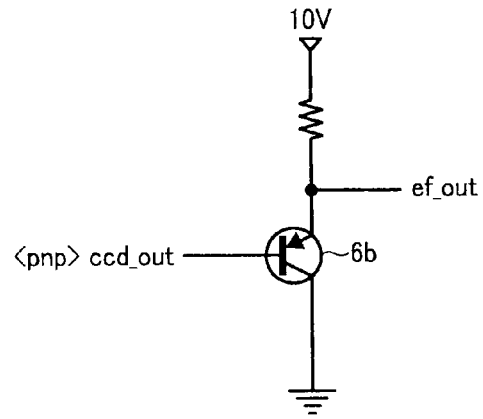

FIGS. 4A to 4D are diagrams of circuit configurations when a transistor is used for the EF 6. When an npn transistor 6a is used for the EF 6, as shown in FIG. 4A, the signal is buffered with ground (GND) reference. In contrast, when a pnp transistor 6b is used for the EF 6, as shown in FIG. 4B, the signal is buffered with Vcc (power supply) reference. These are called the L-side and the H-side reference potentials respectively according to the embodiment of the present invention.

Figure 4C:
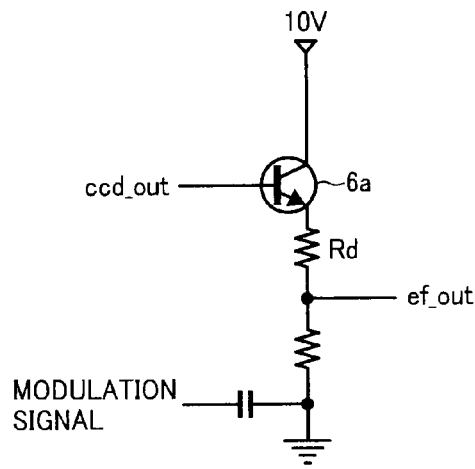
Figure 4D:
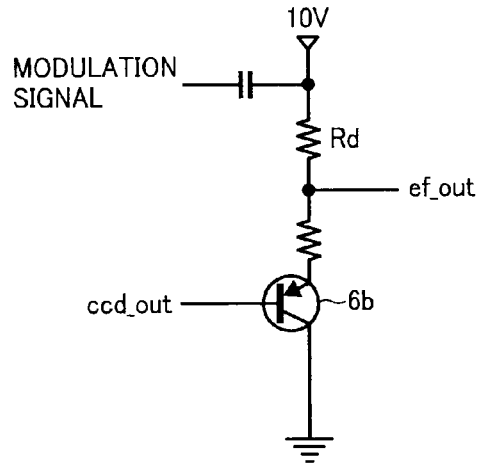

The change in the H-side or the L-side reference potential with the modulation signal is implemented, as shown in FIGS. 4C and 4D, by connecting the modulation signal to the respective reference potentials in FIGS. 4A and 4B and changing each reference potential with the modulation signal. At this time, if the polarity of the reference potential is changed to a polarity that is the same as that of the variation of the image signal, then the variation of the SSCG 2 can be canceled out, and such a signal is output from the EF 6.

"Rd" in FIGS. 4C and 4D is a resistor to determine a ratio used to superimpose the modulation signal on the image signal, and the modulation signal is superimposed thereon with a ratio determined by a voltage division ratio of the Rd and an emitter resistor.

Figure 5:
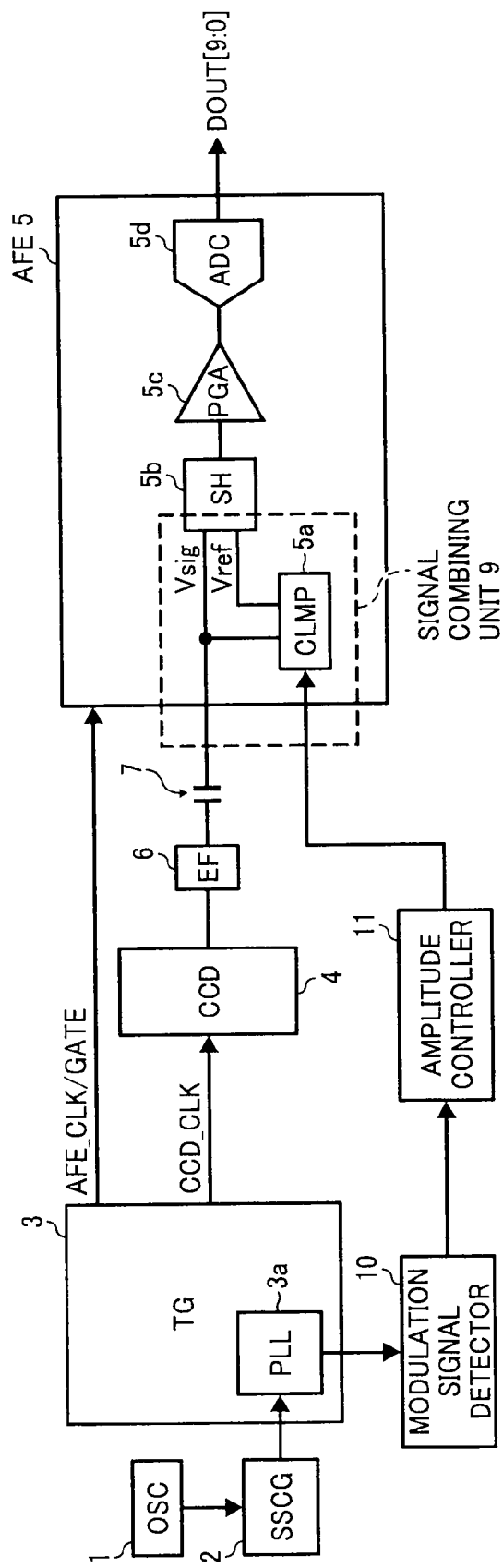
FIG. 5 is a block diagram of a circuit configuration used to correct the modulation signal with signal reference potential inside the AFE and to superimpose the modulation signal on the image signal.

In a configuration for implementing the latter, the output signal can be easily corrected by employing a differential operation in the AFE 5. Specifically, in the AFE 5, to extract a signal component (light output component), the SH 5b calculates a difference between the image signal Vsig (=Vref+light output) and the Vref. Therefore, as shown in FIG. 5, by inputting the amplitude-controlled modulation signal to the Vref through a reference terminal of the SH 5b, it is possible to easily combine the image signal and the modulation signal without addition of any other component and cancel out the variation. In this case, a signal combining unit 9 is formed with the SH 5b in the AFE 5 and the CLMP 5a that supplies the reference potential to the SH 5b.

A specific method of controlling an amplitude of the modulation signal is explained below.

Figure 6:
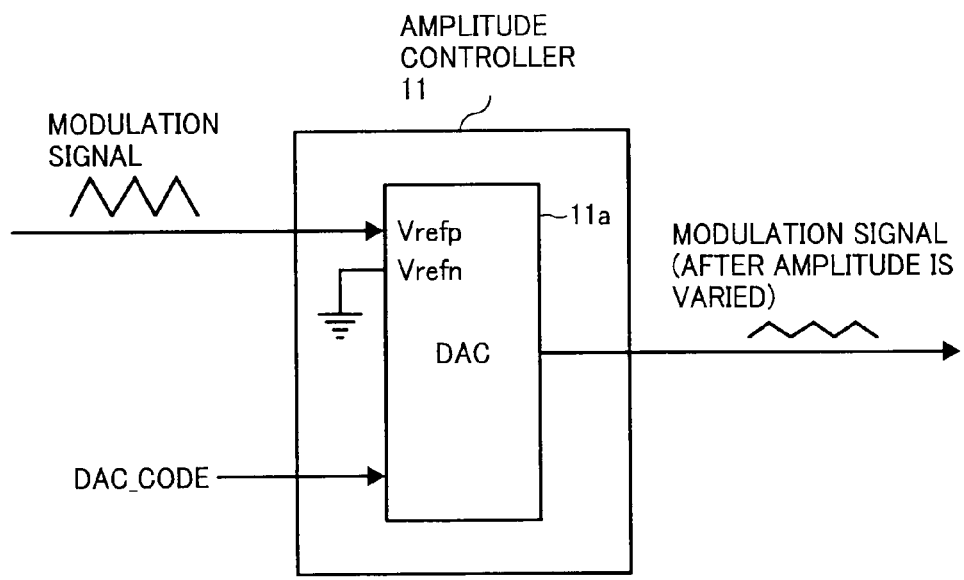
FIG. 6 is a block diagram of an example of using a multiplication DAC (MDAC) for an amplitude controller shown in FIGS. 3 and 5.

FIG. 6 is a block diagram of an example of using a multiplication DAC (MDAC) for the amplitude controller 11 shown in FIGS. 3 and 5. By using the multiplication DAC (MDAC) for the amplitude controller 11, the amplitude can easily be controlled. In FIG. 6, the DAC 11a has a function of outputting a voltage between a high-side reference voltage (Vrefp) and a low-side reference voltage (Vrefn) according to DAC code (DAC_CODE), and satisfies the following relationship if 8 bit-DAC:

$$Vout=(Vrefp-Vrefn)*DAC\_CODE/255+Vrefn.$$

Namely, by inputting the modulation signal to the Vrefp and the reference potential (GND) to the Vrefn, variable voltage division of the modulation signal becomes possible. The variable characteristic shows a linear tendency when the horizontal-axis represents the DAC code (DAC_CODE) and the vertical-axis represents an amplitude of the modulation signal as shown in the characteristic graph of FIG. 7. Furthermore, because a high resolution (>8 bits) can be comparatively easily obtained in the DAC 11a, it is advantageous that a variable step of the amplitude can be easily obtained. The DAC_CODE is an amplitude control value, and how to calculate the value will be explained later with reference to a flowchart of FIG. 28.

Figure 7:
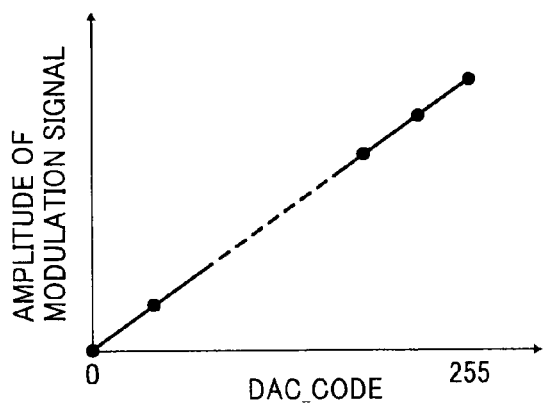
FIG. 7 is a characteristic graph of a characteristic of the modulation signal when the multiplication DAC (MDAC) is used for the amplitude controller.

FIG. 7 represents an amplitude of an output value (modulation signal after the amplitude is changed) for an input DAC_CODE when a voltage signal (output from the modulation signal detector) having a certain amplitude as Vrefp is received. Specifically, because the output value changes according to the variation of Vrefp even if the DAC_CODE is constant, the amplitude of the output value indicates the amplitude of the change.

In FIG. 6, the Vrefn is set to GND, however, this means that it is connected to ground (GND) in an alternating-current manner, and thus a direct-current (DC) voltage may be connected thereto. Furthermore, although not shown, by applying a signal opposite in phase (inversion signal) to the Vrefp, to the Vrefn, the change of the DAC_CODE allows not only control of the amplitude of the modulation signal but also inversion of the phase for output. The same goes for all the following configurations.

However, if the DAC 11a is used as shown in FIG. 6, the cost increases, and sufficient frequency characteristic cannot always be obtained. The reason why the sufficient frequency characteristic cannot be obtained is that the DAC 11a is not originally produced for an AC signal, or that the impedance becomes high when the amplitude controller 11 is formed with a resistor ladder (R-2R). Particularly, it may be negligible that the frequency characteristic causes the amplitude of the modulation signal to change, however, if the phase shifts, then correction itself cannot be performed. This is because the correction cannot be performed on signals with different phases.

Figure 8:
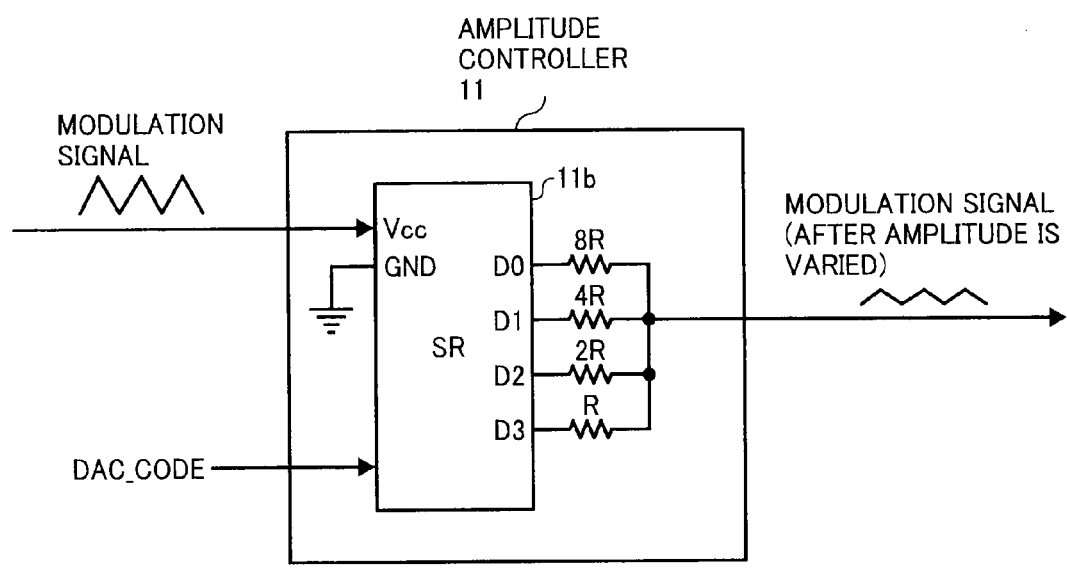
FIG. 8 is a block diagram of an example of using a shift register (SR, 4 bits) for the amplitude controller.

The problems can be easily dealt with by forming the amplitude controller 11 with a shift register or a flip-flop and with a plurality of resistors as shown in FIG. 8. FIG. 8 is a block diagram of a configuration of using a shift register (SR, 4 bits) 11b for the amplitude controller 11. The modulation signal is connected to the power supply (Vcc) and GND is set to DC potential (this also means that the DC potential is connected to ground (GND) in an alternating-current manner). Then the DAC_CODE (serial code) is input to the shift register 11b. An output is obtained at a combined voltage of 4-bit output (D0 to D3), and each bit is weighted by forming a resistance of each bit with a ratio of nth power of 2.

Figure 9:
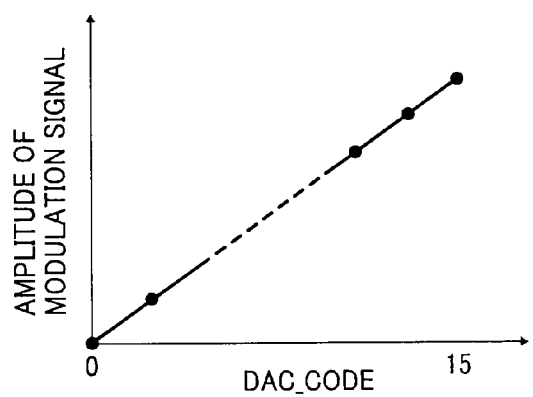
FIG. 9 is a characteristic graph of a characteristic of the modulation signal when the shift register is used for the amplitude controller.

With the configuration shown in FIG. 8, as shown in the characteristic graph in FIG. 9, the amplitude is linearly varied by the DAC_CODE, and thus the MDAC can be simply or inexpensively configured. Moreover, because the modulation signal is connected only to the power supply Vcc, the frequency characteristic can be sufficiently ensured if the resistor is appropriately selected. Furthermore, because a variable step is determined by the number of outputs, it is possible to easily ensure a resolution of about 8 bits although it is difficult to obtain a resolution as high as that of the DAC. If a full-color (RGB channels) compatible function or a high resolution (>8 bits) is obtained with the configuration, by using a plurality of shift registers 11b, this case can be easily dealt with.

It should be noted that FIG. 9 also represents an amplitude of an output value (modulation signal after the amplitude is changed) for an input DAC_CODE when a voltage signal (output from the modulation signal detector) with a certain amplitude as the Vrefp is received. Specifically, because the output value changes according to the variation of Vrefp even if the DAC_CODE is a constant value, the amplitude of the output value indicates the amplitude of the change.

Because the shift register (SR) 11b is serially connected flip-flops (FFs), the amplitude controller 11 shown in FIG. 8 can be also formed with the FFs and the resistors more simply and inexpensively.

Figure 10:
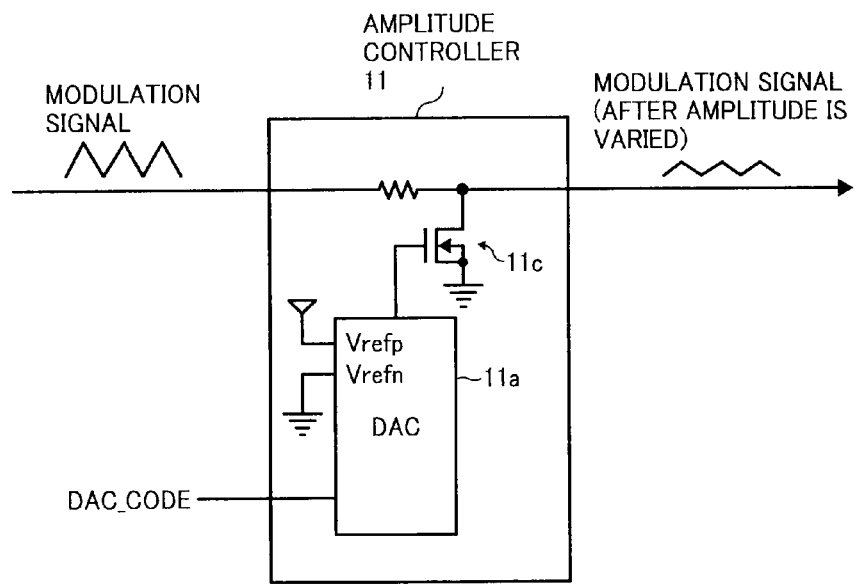
FIG. 10 is a block diagram of an example of using the DAC for the amplitude controller and using MOSFET as an electrically controllable resistor.

Meanwhile, to satisfy the frequency characteristic and the variable resolution, an electrically controllable resistor or capacitor can also be used. FIG. 10 is a block diagram of a configuration of using a metal-oxide-semiconductor field-effect transistor (MOSFET) 11c as a variable resistor. In the MOS, by controlling a gate-source voltage, drain-source ON-resistance can be varied. The DAC 11a is used to supply a voltage to the gate. At this time, because the voltage supplied by the DAC 11a is a direct current, there is no need to consider the frequency characteristic of the DAC 11a which is thought to be the problem. Beside, because the variable resolution is determined by the DAC 11a, sufficient resolution can be easily obtained.

Figure 11:
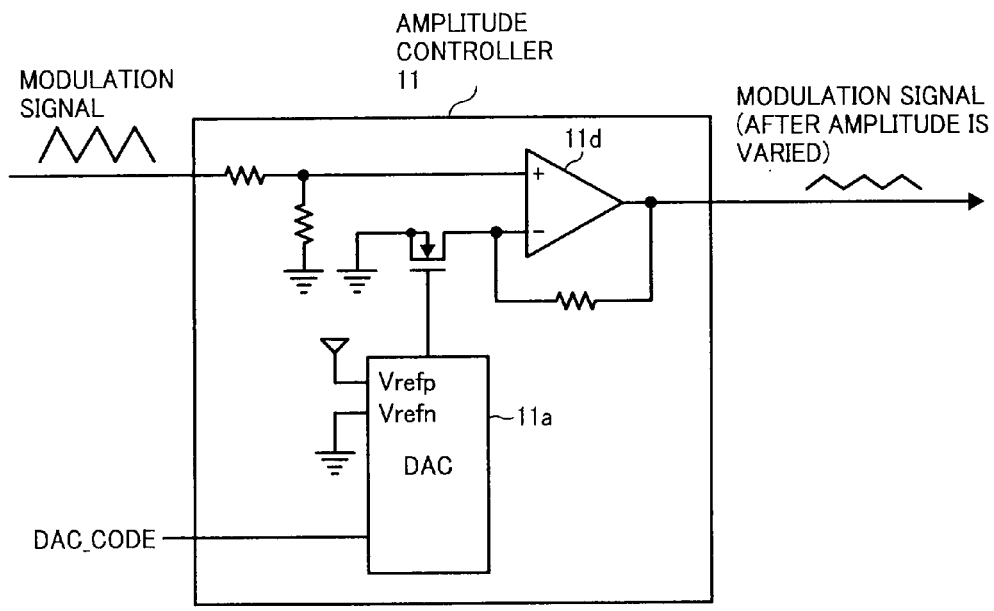
FIG. 11 is a block diagram of an example of using the DAC for the amplitude controller and using an operational amplifier as the electrically controllable resistor.
Figure 12:
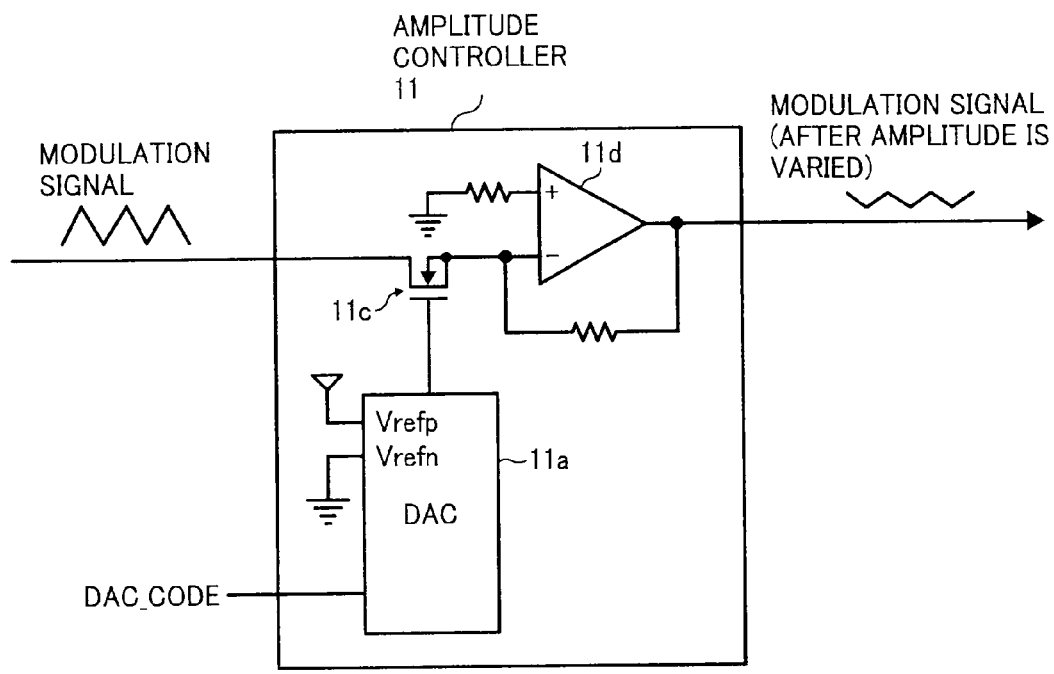
FIG. 12 is a block diagram of a modification of the example of using the DAC for the amplitude controller and using the operational amplifier as the electrically controllable resistor.

In the circuit of FIG. 10, the voltage division ratio (attenuation rate) is changed to change the amplitude, however, as shown in FIGS. 11 and 12, an operational amplifier 11d can be used to enable dealing with both attenuation and amplification, and a variable range can thereby be increased. The circuit shown in FIG. 11 is a non-inverting amplifier in which an amplification factor is variable. When only the non-inverting amplifier is provided, then the amplification factor can be varied only in an amplification direction, and thus a voltage divider circuit is provided at an input thereof. The circuit shown in FIG. 12 is an inverting amplifier, and thus there is no need to provide the voltage divider circuit at the input as compared with the non-inverting amplifier. This circuit also has a function of inverting the phase of the modulation signal.

Figure 13:
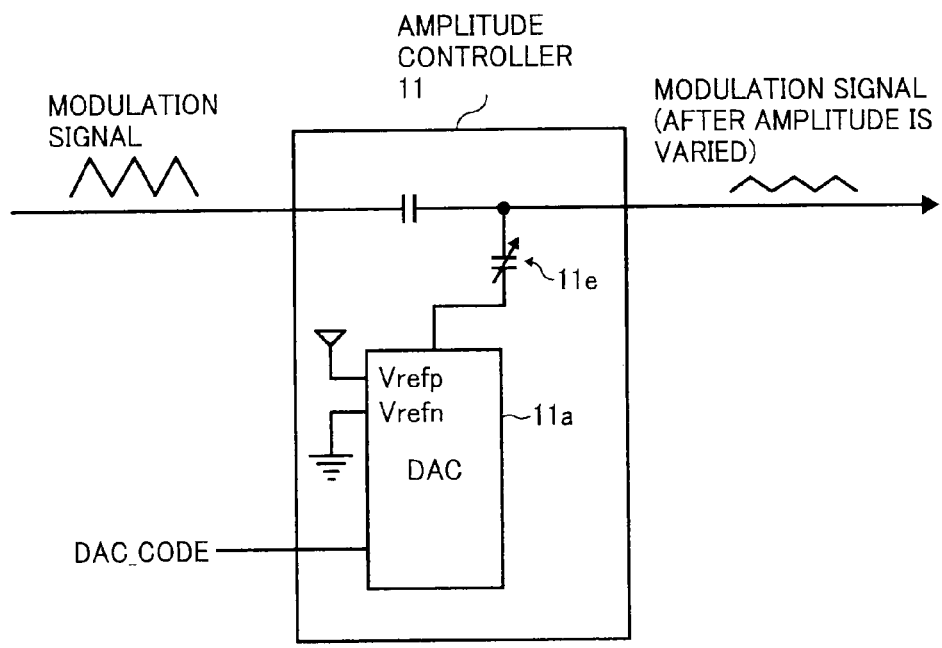
FIG. 13 is a block diagram of an example of using the DAC for the amplitude controller and using a variable capacitance device as an electrically controllable capacitor.

Meanwhile, a capacitance variable configuration shown in FIG. 13 can be employed. In the circuit shown in FIG. 13, a variable capacitance device 11e such as a varicap is used instead of the operational amplifier, and in this case, the modulation signal is divided by the capacitance.

Figure 14:
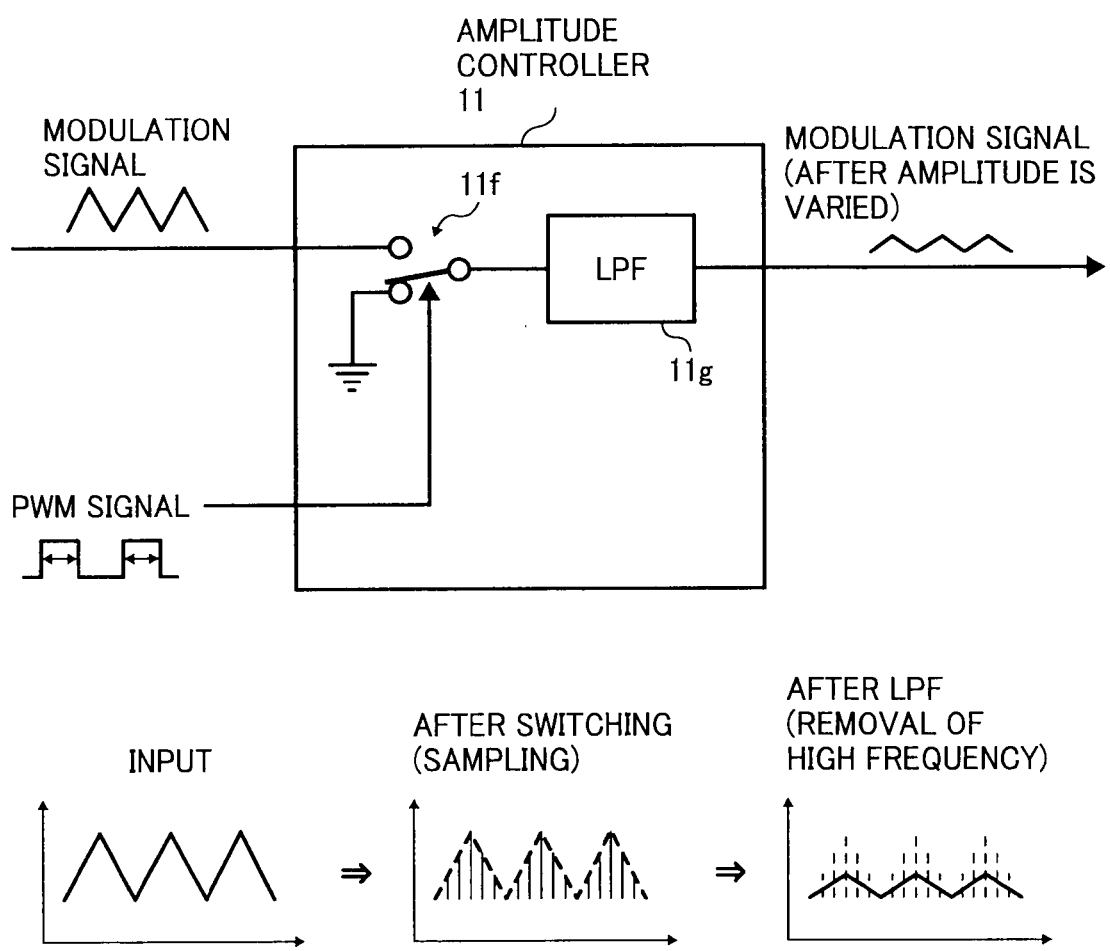
FIG. 14 is a diagram of a configuration of the amplitude controller using a PWM signal (switching) and of states of input and sampling, and a state after a high frequency is removed.

The amplitude can be varied by performing switching (sampling) based on a PWM signal. FIG. 14 is a diagram of a configuration of the amplitude controller in which such a switching is performed, and of states of input, sampling, and removal of high frequency component.

In FIG. 14, the amplitude controller 11 includes a switch (selector) 11f that switches between an input signal and a PWM signal for controlling the selector 11f, and the LPF 11g for removing the high frequency component. An input to the LPF 11g is implemented by switching between the modulation signal and the GND (reference bottom level) with the frequency of the PWM signal (fpwm), or the modulation signal is sampled with the fpwm. The component of the fpwm is removed from the sampled modulation signal by the LPF 11g, and modulation signals with different amplitudes are recovered. The amplitude of the modulation signal is changed by the width of the PWM signal, and, for example, when a duty of the PWM signal is 50%, the amplitude becomes one-half.

The TG 3 that generates signals such as a CCD drive signal generally changes a phase by using a resistor or the like. Therefore, by using the drive signal, amplitude variable control becomes possible with an inexpensive configuration to which only the selector 11f and the LPF 11g are added. Particularly, the frequency of the drive signal is several to tens of megahertz, while the frequency (fmod) of the modulation signal is tens of kilohertz, and thus the fpwm is high and is largely apart from the fmod. Therefore, the frequencies can be easily separated so that it is possible to use the inexpensive LPF 11g.

In situations where the PWM signal cannot be generated in the TG 3, the PWM signal can be generated when components including a reference clock (MCLK, etc.), a triangular-wave generation circuit (LPF), a comparator for pulse generation, and a generation circuit (DAC) for a variable DC voltage input to the comparator are provided.

The amplitude variability of the modulation signal becomes possible in the configurations of the amplitude controllers exemplified so far. However, the amplitude of a detected modulation signal is generally small such as several millivolts (mV), and the TG 3 and the AFE 5 are physically separated from each other in an actual control board. Therefore, the modulation signal may be affected by electric noise.

Figure 15:
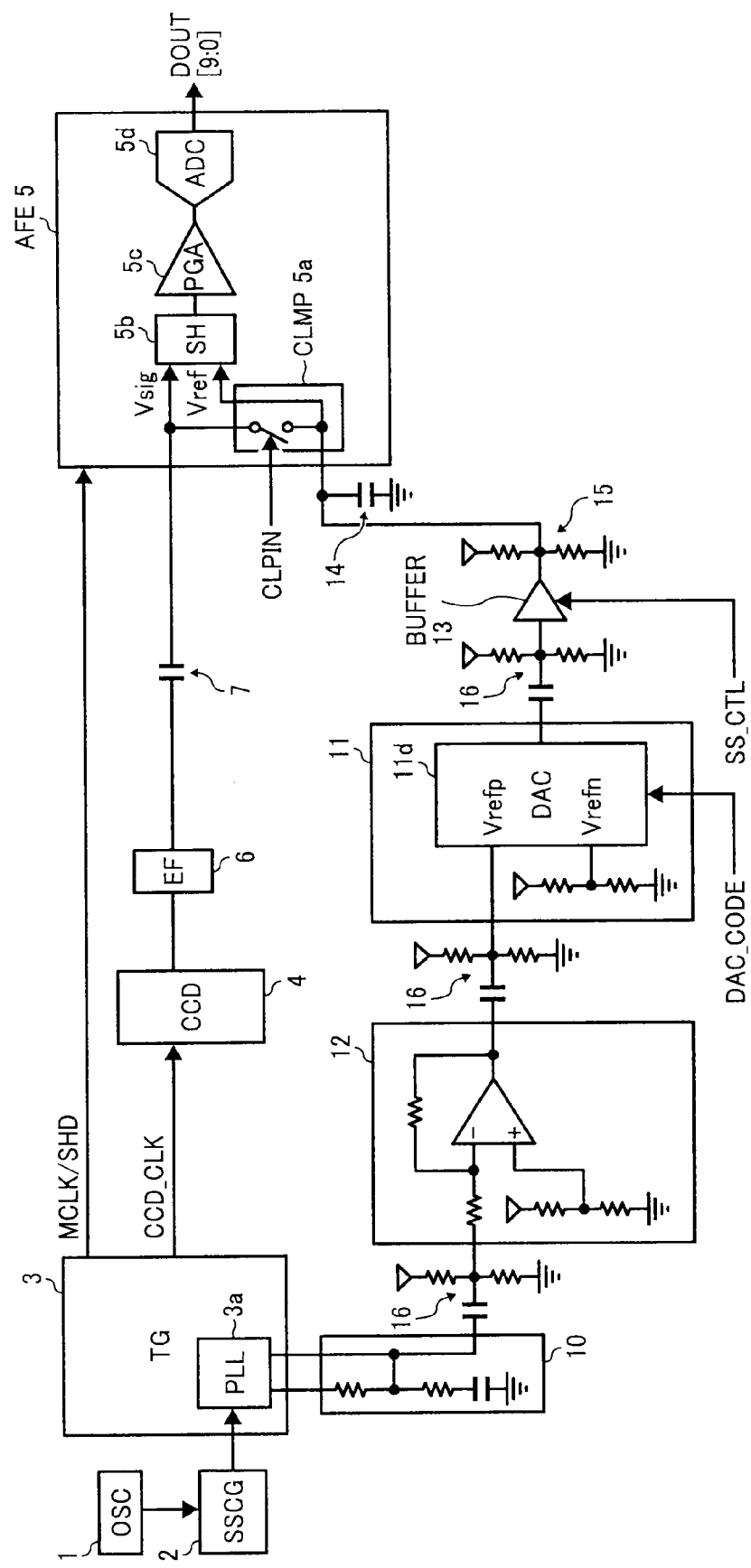
FIG. 15 is a block diagram of an example of arranging an amplifier between a modulation signal detector and the amplitude controller and arranging a buffer between the amplitude controller and the AFE based on the configuration shown in FIG. 5.

As shown in FIG. 15, therefore, the modulation signal is detected by the modulation signal detector 10 and is amplified by the amplifier 12, so that noise resistance thereof can also be increased. Although not shown in FIG. 15, the actual configuration is such that the amplifier 12 is arranged near a phase detector and the amplitude controller (i.e., the MDAC) 11 is arranged near the AFE 5, so that the amplified signal is transmitted along a long distance. In the configuration shown in FIG. 15, the amplifier 12 is provided between the modulation signal detector 10 and the amplitude controller 11 and the buffer 13 is provided between the amplitude controller 11 and the AFE 5 in the configuration shown in FIG. 5.

There is sometimes a case in which the polarity of variation occurring in the image signal may not be in-phase with the modulation signal but may be inverted depending on which CCD has been used for the CCD 4 or depending on the type of the waveform of the image signal. If this is the case, by inverting the phase of the modulation signal, the inversion of the polarity can be easily dealt with. FIG. 15 is configuration in which the phase of variation is inverted, and the modulation signal is inverted in the amplifier 12.

A decoupling capacitor 14 of sub-microfarad (μF) order is generally provided to a reference terminal of the AFE 5 that receives the modulation signal. To prevent degradation of the frequency characteristic (especially, phase characteristic) of the modulation signal amplitude-controlled by the amplitude controller 11 with output impedance of the amplitude controller 11 and with the decoupling capacitor 14, the output of the amplitude controller 11 is buffered, and then is input to the AFE 5. By providing the buffer 13 in this manner, the variation due to the phase change can be prevented from not being corrected.

Moreover, as explained above, the variation of the image signal due to the SSCG 2 varies widely due to components and a circuit board used therein. Namely, it is assumed sometimes the variation occurs widely or sometimes no variation occurs. Particularly, in the case in which no variation occurs, superimposition itself of the modulation signal on the image signal is badly affected, which may cause variation to occur in a component that has originally no variation. Therefore, in the embodiment, it is configured to switch so as not to correct the variation in the case of no variation. In other words, as shown in FIG. 15, an output from the buffer of the modulation signal sent from the amplitude controller 11 is controlled with a control signal (SS_CTL). In this case, a DC additional circuit 15 is provided in the downstream of the buffer 13 so that a reference voltage of the AFE 5 is supplied even if the output of the buffer 13 is OFF (Hi-Z).

Furthermore, to detect a modulation signal indicating a modulation profile of the SSCG 2, the reference clock (MCLK etc.) may be F-to-V (frequency-to-voltage) converted. However, by extracting the modulation signal from a loop filter (LF) of the PLL circuit 3a in the TG 3, the detection is easily performed because there is no need to add any component to the configuration. An output of the LF is input to a voltage-controlled oscillator (VCO) of the PLL circuit 3a, and the VCO generates a clock of frequency equal to an input voltage. In other words, when the frequency is modulated in the SSCG 2, then a signal according to the modulation period of the SSCG 2 is input to the VCO input. A delay looked loop (DLL) can be used instead of the PLL circuit 3a.

Meanwhile, in FIG. 15, an AC-coupled capacitor and a DC additional circuit arranged between each functional blocks form a DC regeneration circuit 16 that controls a DC voltage in each of the blocks.

The amplitude control explained so far is implemented by varying an amplitude of the modulation signal, and, actually, it is important what should be detected to automatically correct the variation due to the SSCG and how to control the amplitude. Therefore, how to automatically control the amplitude of the modulation signal is explained below.

Figure 16:
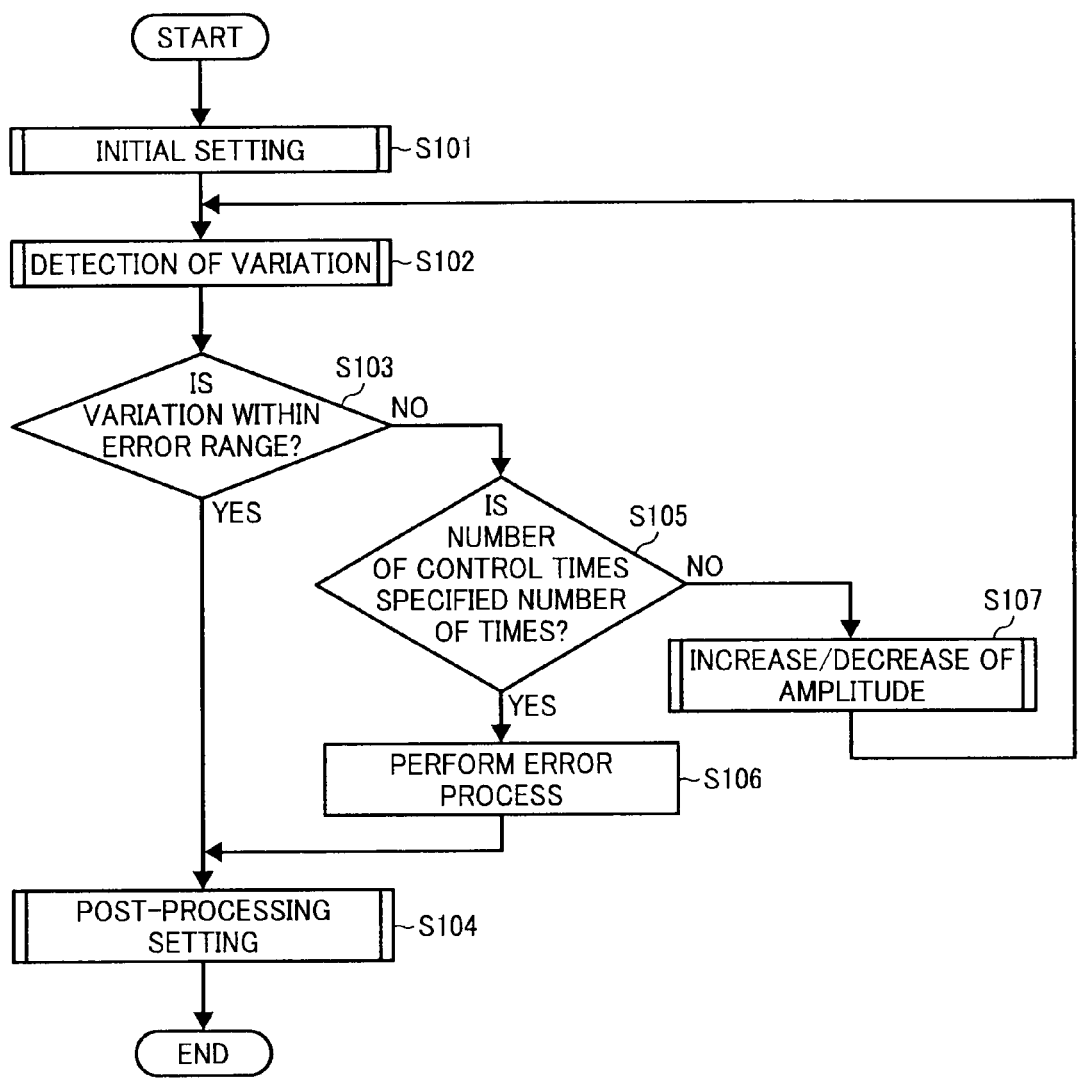
FIG. 16 is a flowchart of a control procedure for automatically controlling an amplitude of the modulation signal according to the embodiment.

FIG. 16 is a flowchart of a control procedure for automatically controlling the amplitude of the modulation signal. The control procedure includes a process of detecting a variation occurring in an image signal due to frequency modulation, a process of increasing/decreasing the amplitude of the modulation signal based on the detected variation, and a process of determining whether the variation is within a preset error range. First, the process is started, then the initial setting is performed (Step S101). A variation due to frequency modulation is detected (Step S102), and it is determined whether the variation is within the range of an error (Step S103). If the variation is within the range of an error, then the setting is returned as required for a next control process (post-processing setting: Step S104), and the automatic control is ended. If the variation is outside of the range of an error, then it is checked whether the control has been performed for a specified number of times (Step S105). If the control has been performed for the specified number of times, an error process is performed (Step S106), and after the post-processing setting (Step S104), the process is ended. If the control has not been performed for the specified number of times, the amplitude is changed (Step S107), the process returns to Step S102, and the variation is again detected and determined. The amplitude control is performed by the loop processes.

The error process is performed to prevent the process from not being ended because the control is not ended, and the number of control times (number of varying times of amplitude) is determined to thereby determine whether an error occurs.

The variation due to the SSCG 2 is usually small such as 1 digit or less in an 8-bit range of an image, and is not related to an output level of the image signal. Therefore, it is suitable to detect the variation from black (dark) data. At this time, because the variation is small as explained above, even if the black data is obtained, the variation may be buried due to effect of random noise, so that the variation may not be appropriately detected.

Figure 17:
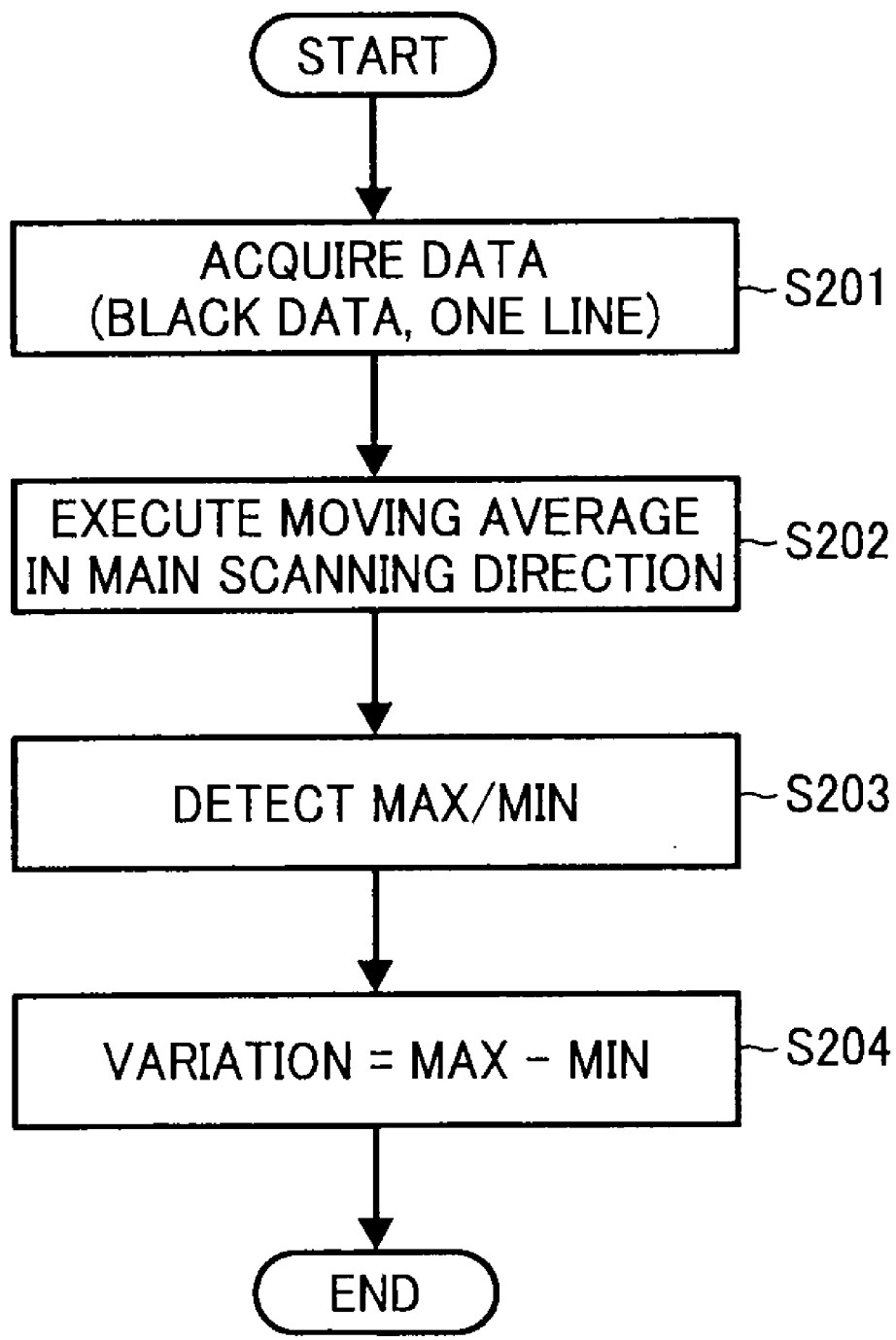
FIG. 17 is a flowchart of a control procedure for subjecting acquired black data for one main-scanning line to a moving average process in a main scanning direction, and detecting, as a variation, a difference MAX−MIN of the main-scanning black data having been subjected to the moving average process.

To appropriately detect the variation, acquired black data for one main-scanning line is subjected to a moving average process in a main scanning direction, so that a difference MAX−MIN of the main-scanning black data after being subjected to the moving average process can also be detected as a variation. FIG. 17 is a flowchart of a control procedure for the detection. First, black-level data for one line is acquired (Step S201), then, the moving average process in the main scanning direction is executed to the acquired data (Step S202). Next, a maximum value (MAX) and a minimum value (MIN) of the main-scanning black data after the moving average process is executed thereto are detected (Step S203), and a difference MAX−MIN between the both values is detected as a variation (Step S204).

Thus, the effect of random noise on the black data can be reduced and the variation due to the SSCG 2 can be appropriately detected. The modulation period of the SSCG 2 is generally asynchronous to a line period, and thus, modulation periods cannot be averaged in the sub-scanning direction. The reason why the modulation period of the SSCG 2 is asynchronous to the line period is that if the modulation period of the SSCG 2 and the line period are synchronized with each other, vertical stripes appear in an image and the stripes become clearly visible. Therefore, the modulation period is usually selected so as to be asynchronous thereto.

However, if the moving average process is performed excessively in the main scanning direction, it not only reduces the noise but also disadvantageously reduces the variation. The moving average process in the main scanning direction is an averaging method used only when the line period and the modulation period are asynchronous to each other. By correcting a main-scanning offset so that the modulation periods in lines of the acquired plurality of lines of black data are synchronized with each other, simple averaging of the modulation periods in the sub-scanning direction becomes possible and the average number is larger than the number of average lines. Thus, the effect of noise can be further reduced. Generally, because the line period and the modulation period of the SSCG 2 are known, the main-scanning offset can easily be corrected.

Figure 18:
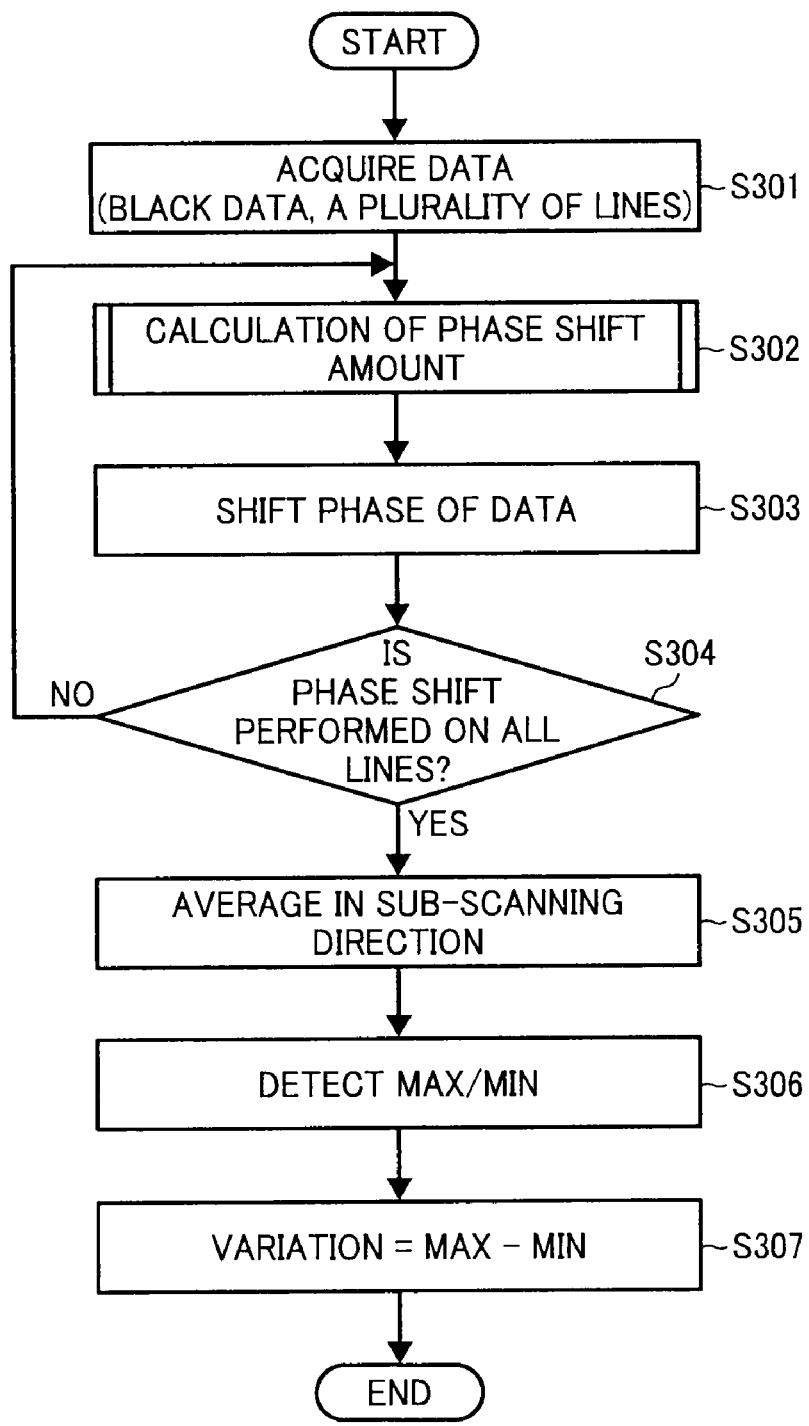
FIG. 18 is a flowchart of a control procedure for correcting main-scanning offset.
Figure 19:
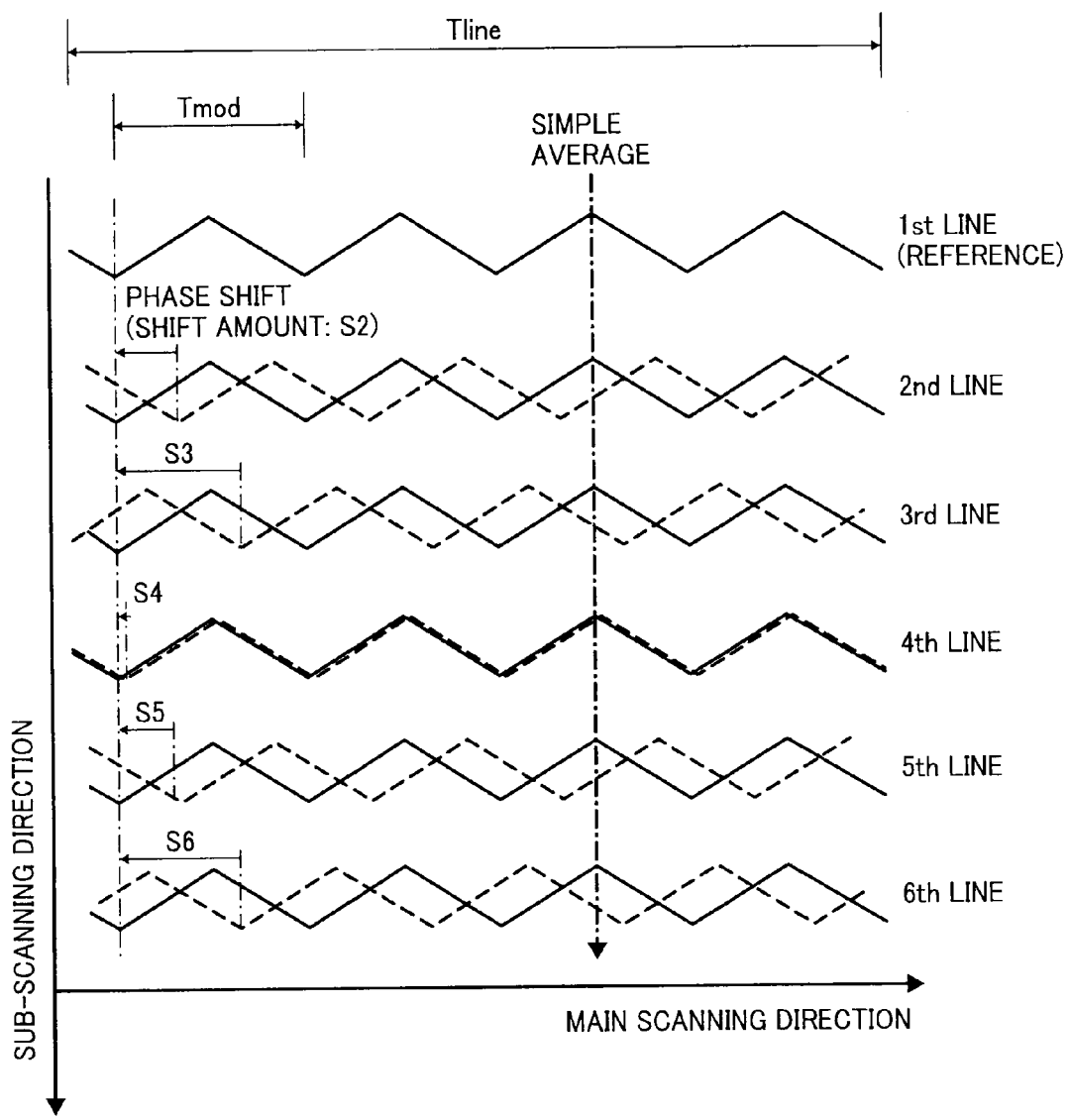
FIG. 19 is a diagram of a state of phase shift.

FIG. 18 is a flowchart of a control procedure for correcting main-scanning offset. As shown in the flowchart, first, a plurality of lines of black data is acquired (Step S301). Then, in the plurality of lines of black data, the modulation periods of the SSCG 2 are asynchronous to each other in the lines as explained above, and thus, an amount of phase shift (main-scanning offset amount: Sn) is calculated to synchronize the modulation periods with the phase in the first line (Step S302). The phase of the acquired black data is shifted in the main scanning direction based on the calculated amount of phase shift (Step S303). This process is performed on all the acquired lines (Step S304). In the black data after the phase is shifted, as indicated by solid lines in FIG. 19, the modulation periods are synchronized with one another in the lines. Therefore, these periods are averaged in the sub-scanning direction (Step S305), the maximum value MAX and the minimum value MIN of the black data are detected (Step S306), and a difference MAX−MIN of the acquired main-scanning black data is detected as a variation (Step S307).

The amount of phase shift can be calculated from an amount of out-of-phase between the line period (Tline) and the modulation period (Tmod), and the amount of out-of-phase in each line is a cumulative value of the amounts of out-of-phase in the previous lines.

Figure 20:
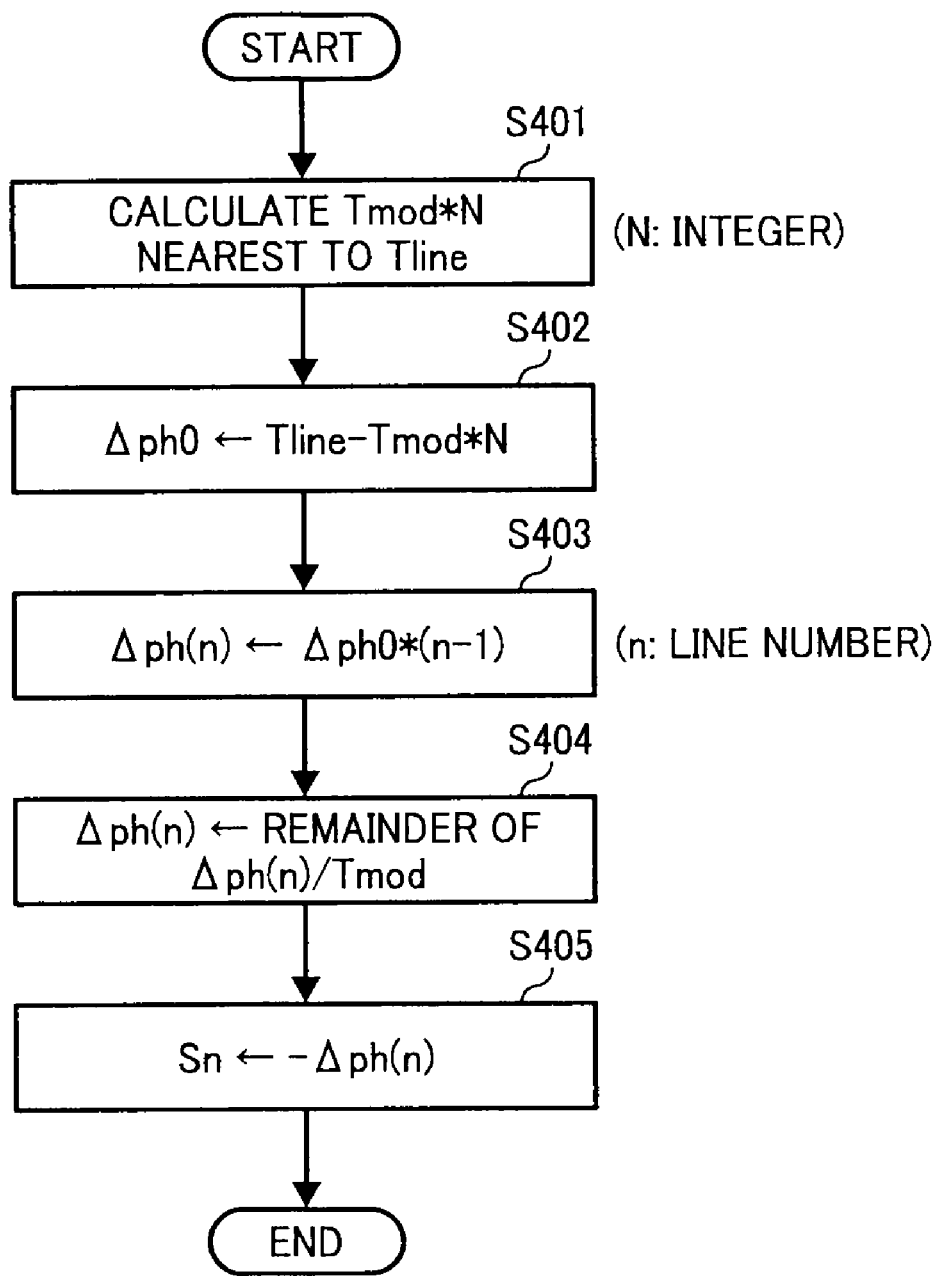
FIG. 20 is a flowchart of a procedure for calculating an amount of phase shift.

FIG. 20 is a flowchart of a procedure for calculating an amount of phase shift. As shown in this flowchart, first, Tmod*N (N: integer) nearest to Tline is calculated (Step S401). An amount of out-of-phase ($\Delta$ph0) between the line period and the modulation period is obtained as follows (Step S402):

Tline−Tmod*N.

At this time, the out-of-phase occurs in each line, and thus, an amount of out-of-phase $\Delta$ph(n) in an nth line is as follows (Step S403):

$\Delta$ph0*(n−1).

Then, $\Delta$ph(n) is corrected to a value within a first period of the modulation period (the out-of-phase in the first period is equivalent to a value with no out-of-phase) (Step S404), and the amount of phase shift (Sn) is (−$\Delta$ph(n)) with the same absolute value but an inverted polarity (Step S405).

As explained above, the main-scanning offset is corrected so that the modulation periods in the lines are synchronized with each other, and averaging in the sub-scanning direction is performed thereon, so that not only the random noise but also noise asynchronous to the SSCG 2 can be largely reduced and a variation can be appropriately detected.

In the example, offsets of all the acquired black data are corrected and the corrected data are averaged. However, an offset of a pixel position may be corrected for each line so that all pixel positions targeted for averaging become in-phase with respect to the modulation period and the pixel positions may be averaged.

Figure 22:
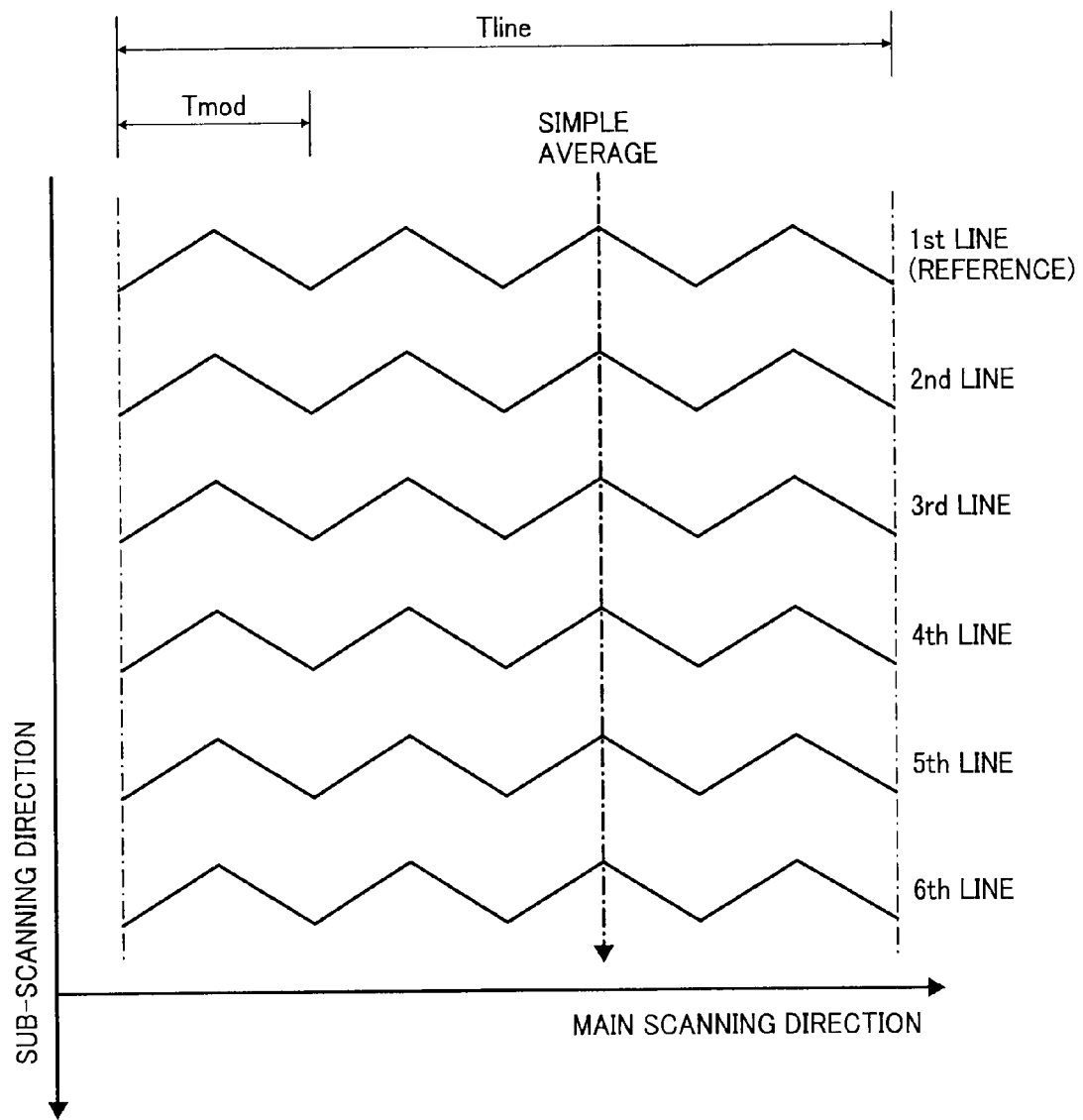
FIG. 22 is a diagram of a state in which the acquired black data is averaged in the sub-scanning direction.

Moreover, in the example, the modulation periods are corrected so as to be synchronized with the line period and are averaged. However, by setting the line period upon automatic control to an integral multiple of the modulation period, namely, Tline=Tmod*N, the averaging in the sub-scanning direction can easily be performed. In this case, in the acquired black data as shown in FIG. 22, because the line period and the modulation periods are synchronized with each other, the modulation periods are only averaged in the sub-scanning direction.

Figure 21A:
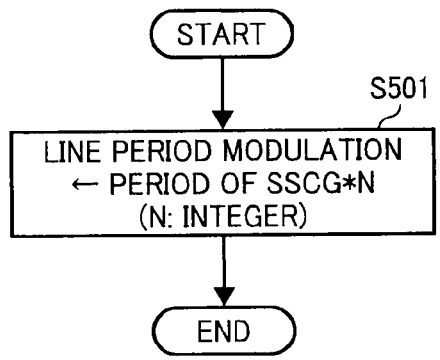
FIGS. 21A to 21C are flowcharts of control procedures for setting a line period upon automatic control as an integral multiple of a modulation period and automatically controlling the amplitude of the modulation signal.
Figure 21B:
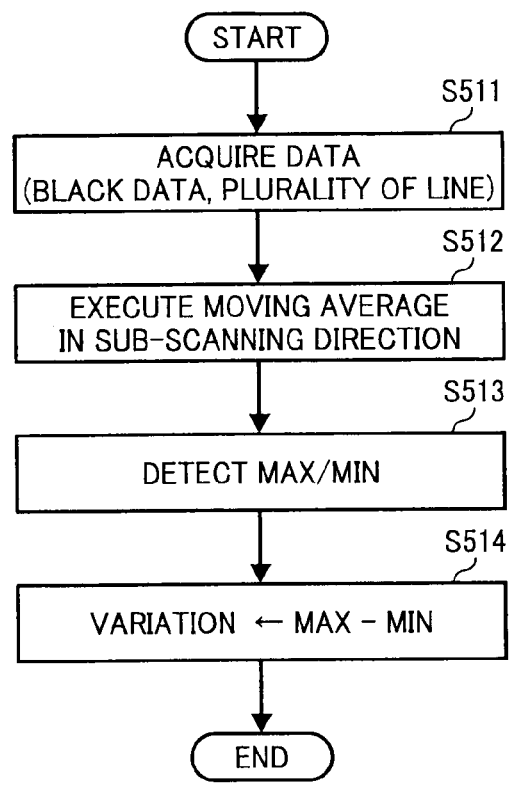
Figure 21C:
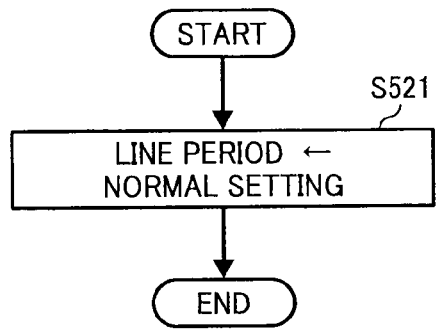

FIGS. 21A to 21C are flowcharts of control procedures for the above case. As shown in these flowcharts, first, the line period is set to an integral multiple of the modulation period of the SSCG upon the initial setting (Step S501). In the detection of a variation, a plurality of lines of black data are acquired (Step S511), averaging in the sub-scanning direction is performed thereon (Step S512), a maximum value MAX and a minimum value MIN of the black data after being averaged are detected (Step S513), and a difference MAX−MIN of the main-scanning black data after being averaged is detected as a variation (Step S514). Lastly, in the post-processing setting, the line period is returned to the normal setting (Step S521). Thus, even if the modulation period of the SSCG 2 is asynchronous to the line period, effect of noise is largely reduced, so that the process of detecting the variation can easily be executed.

In addition to the averaging, by setting a PGA gain or the like of the AFE 5 to a value larger than a usually used value upon automatic control, the variation can be more clearly detected. In this case, the gain is set to be large upon the initial setting (here, 10 times, and usually, about one or two times), and the set gain may be returned to the normal gain in the post-processing setting.

Figure 23A:
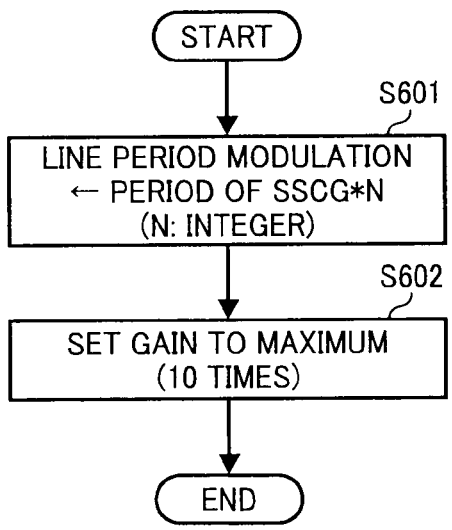
FIGS. 23A to 23C are flowcharts of control procedures for making a PGA gain or the like of the AFE upon automatic control larger than a normally used value and automatically controlling the amplitude of the modulation signal.
Figure 23B:
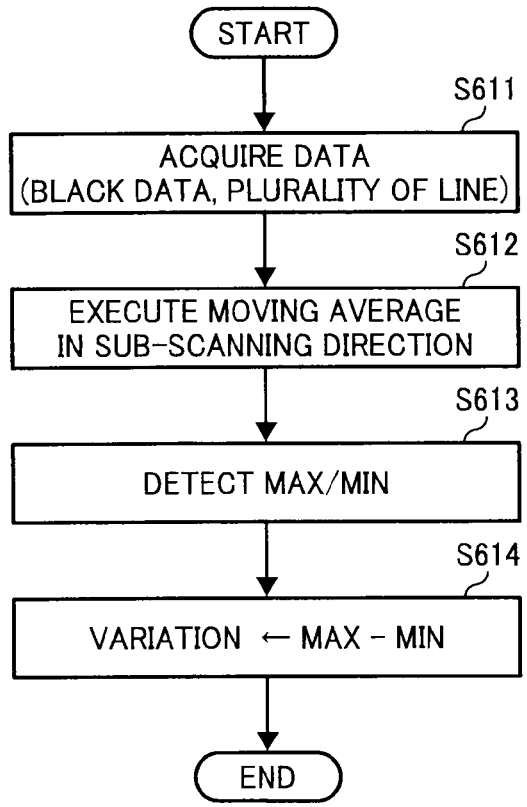
Figure 23C:
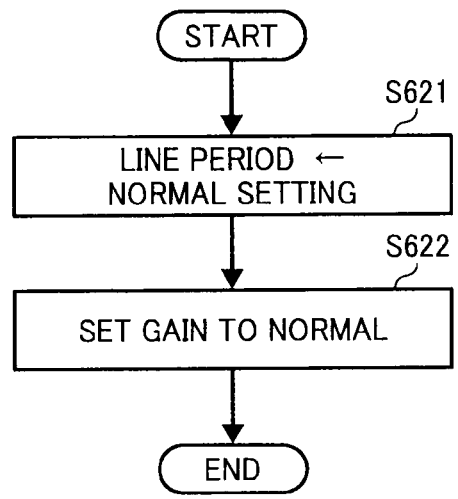

FIGS. 23A to 23C are flowcharts of control procedures for the above case. As shown in these flowcharts, the line period is set to an integral multiple of the modulation period of the SSCG upon the initial setting (Step S601), and a gain is set to the maximum (10 times) (Step S602). Thereafter, in the detection of the variation, similarly to the flowchart of FIG. 21B, a plurality of lines of black data are acquired (Step S611), averaging in the sub-scanning direction is performed thereon (Step S612), a maximum value MAX and a minimum value MIN of the black data after being averaged are detected (Step S613), and a difference MAX−MIN of the main-scanning black data after being averaged is detected as a variation (Step S614). Lastly, in the post-processing setting, the line period is returned to the normal setting (Step S621), and the gain is returned to the normal setting (Step S622). Thus, even if the modulation period of the SSCG 2 is asynchronous to the line period, effect of noise is largely reduced, so that the process of detecting the variation can easily be executed.

Figure 24:
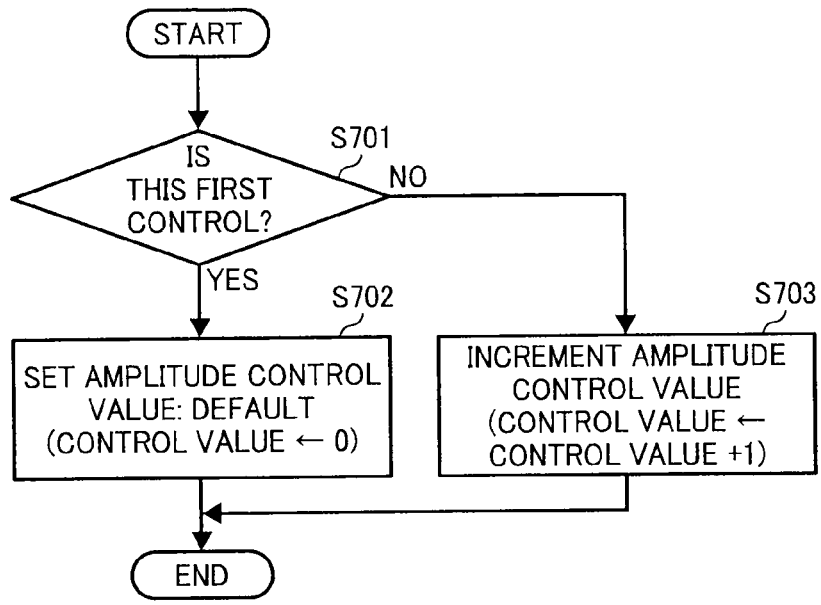
FIG. 24 is a flowchart of a control procedure for amplitude increase/decrease process.
Figure 25:
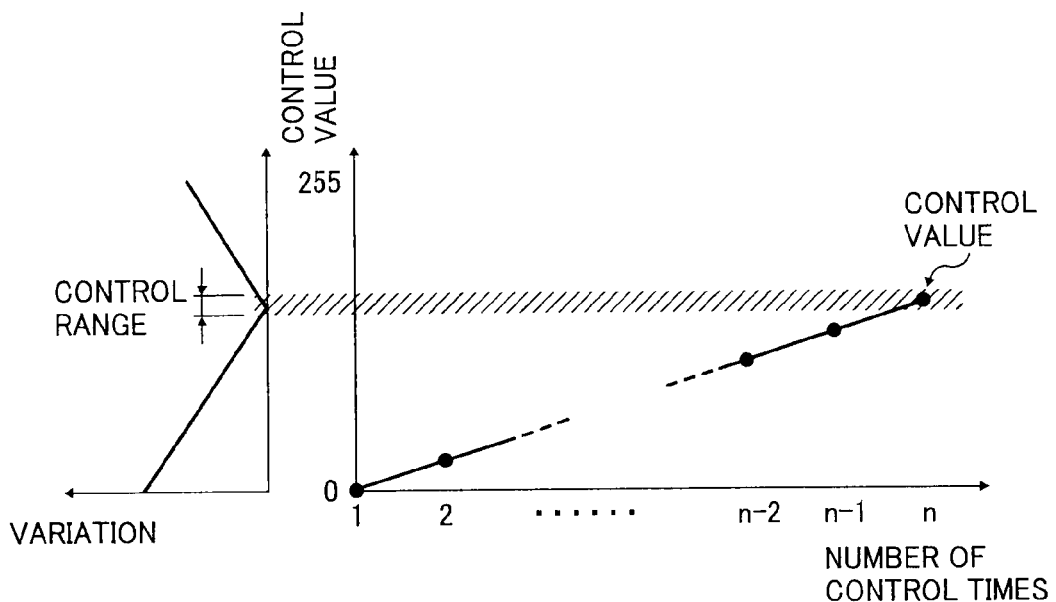
FIG. 25 is a diagram for explaining how the amplitude is controlled when the process is performed according to the flowchart of FIG. 24.

Meanwhile, in an amplitude increase/decrease process, by using a method of incrementing an amplitude control value as shown in a flowchart of FIG. 24, the amplitude can surely be controlled. Specifically, the number of control times is checked (Step S701), a control value is set to 0 (zero) according to the result of the checking (Step S702), or the control value is incremented by one (Step S703). However, a default of the amplitude control value is set to 0 in the flowchart of FIG. 24. Therefore, as shown in FIG. 25, the number of control times (the number of passage times of control loop) is A times where A is a finally determined amplitude control value. FIG. 25 is a diagram of how the amplitude is controlled when the process is performed according to the procedure in FIG. 24. In FIG. 25, the horizontal-axis on the left side in FIG. 25 represents a variation, the horizontal-axis on the right side represents the number of control times, and the vertical-axis represents a control value. The amplitude is controlled so that the control value falls within the control range shown therein.

In the case of the amplitude increase/decrease process as shown in the flowchart of FIG. 24, the control time may be increased depending on the final amplitude control value. Therefore, the control time can be reduced by implementing a control method of detecting a range including a target amplitude control value from the detected variation and the amplitude control value set by then and setting a center value of the detected range to the target amplitude control value so that a target range is gradually narrowed for each control.

Figure 26:
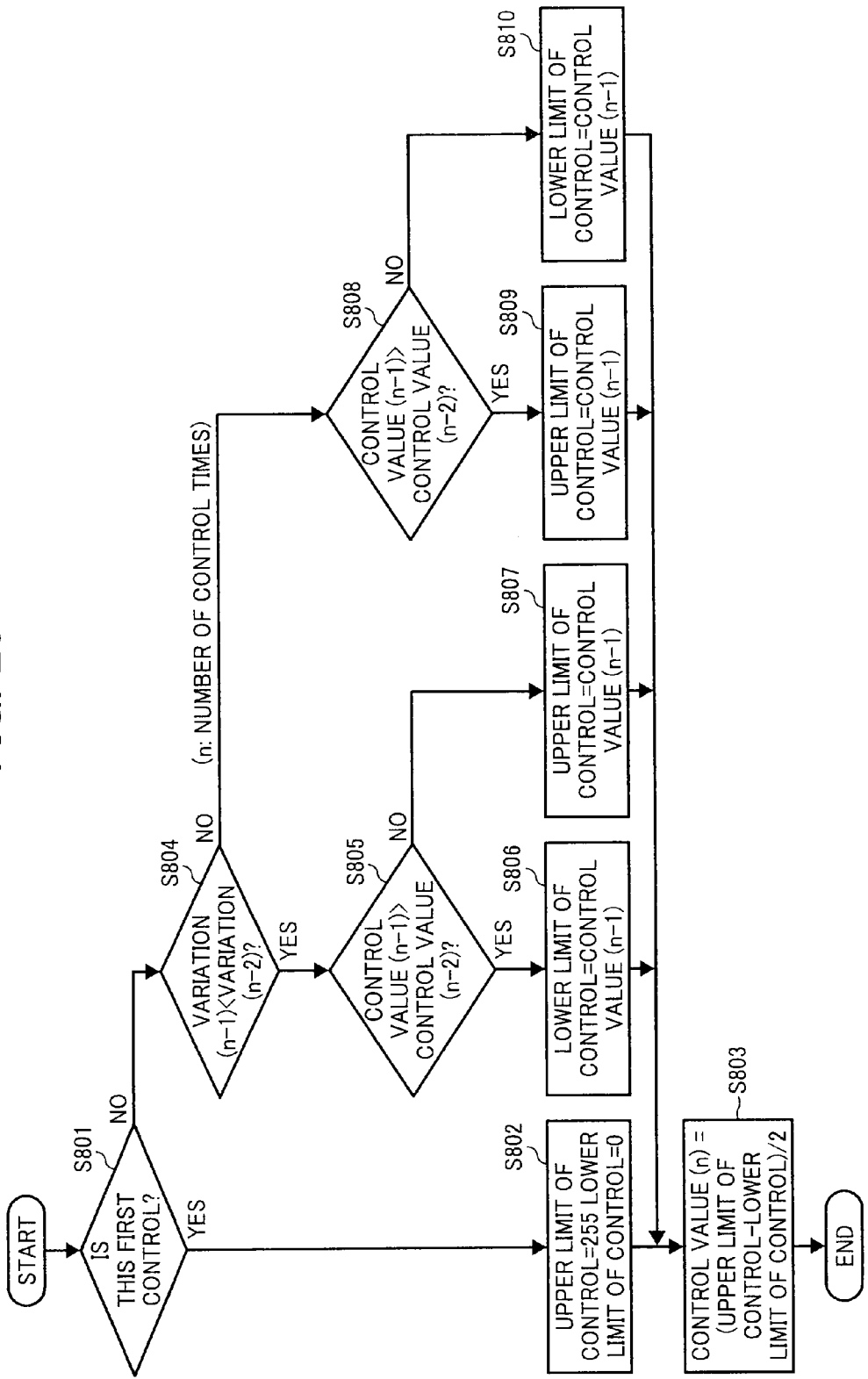
FIG. 26 is a flowchart of a control procedure for amplitude increase/decrease process of gradually narrowing a target range for each control.
Figure 27:
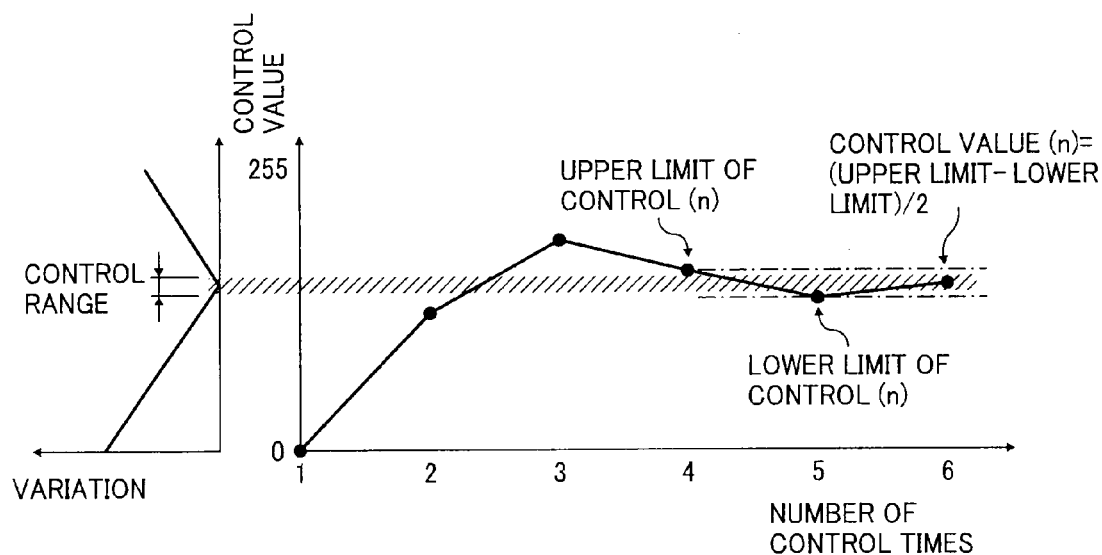
FIG. 27 is a diagram for explaining how the amplitude is controlled when the process is performed according to the flowchart of FIG. 24.

FIG. 26 is a flowchart of a procedure for the process at this time, and FIG. 27 is a diagram of how the amplitude is controlled.

In FIG. 26, the automatic control is started, and a variation at the control value=0 (default) is detected (Step S801). At this time, the variation does not fall within the target range for control, and therefore the process enters a next amplitude increase/decrease process. In the amplitude increase/decrease process, because the control is performed for the first time, an upper limit is set to 255 (maximum) and a lower limit is set to 0 (minimum) (Step S802), and an amplitude control value is set to 128 which is the center value of the upper limit and the lower limit as obtained in the following manner (Step S803):

$$\text{Amplitude control value} = (\text{Upper limit} - \text{Lower limit})/2.$$

Then, the variation is again detected (Step S804), to determine whether the variation falls within the control range. However, because it does not fall within the control range, the process enters again the amplitude increase/decrease process. In the amplitude increase/decrease process, the variation of each amplitude control value 0 of the last time and the time before last is compared with the variation when the amplitude control value is 128 (Steps S805, S806, S807, S808, S809, and S810). As a result, by setting the amplitude control value to 128, the variation is decreased. Specifically, it is determined that the control target value is in a range of 128 or more, the target range of the amplitude control value in which the upper limit/lower limit have been set to 255/0 is narrowed to a range in which the upper limit/lower limit are set to 255/128, the amplitude control value in this case is set to 192 as the center value between the two values (Step S803), and the processes of detecting and determining the variation are again performed. The range of the control value is gradually narrowed in this manner, to finish the control. The processes are performed in the above manner, and, as shown in FIG. 27, the control time can be significantly reduced as compared with that in the increment method as shown in FIG. 25. FIG. 27 also shows the control state based on the coordinate axes similarly to these of FIG. 25, and it is understood from this example that four control times cause the variation to be located nearly in the control range.

Figure 28:
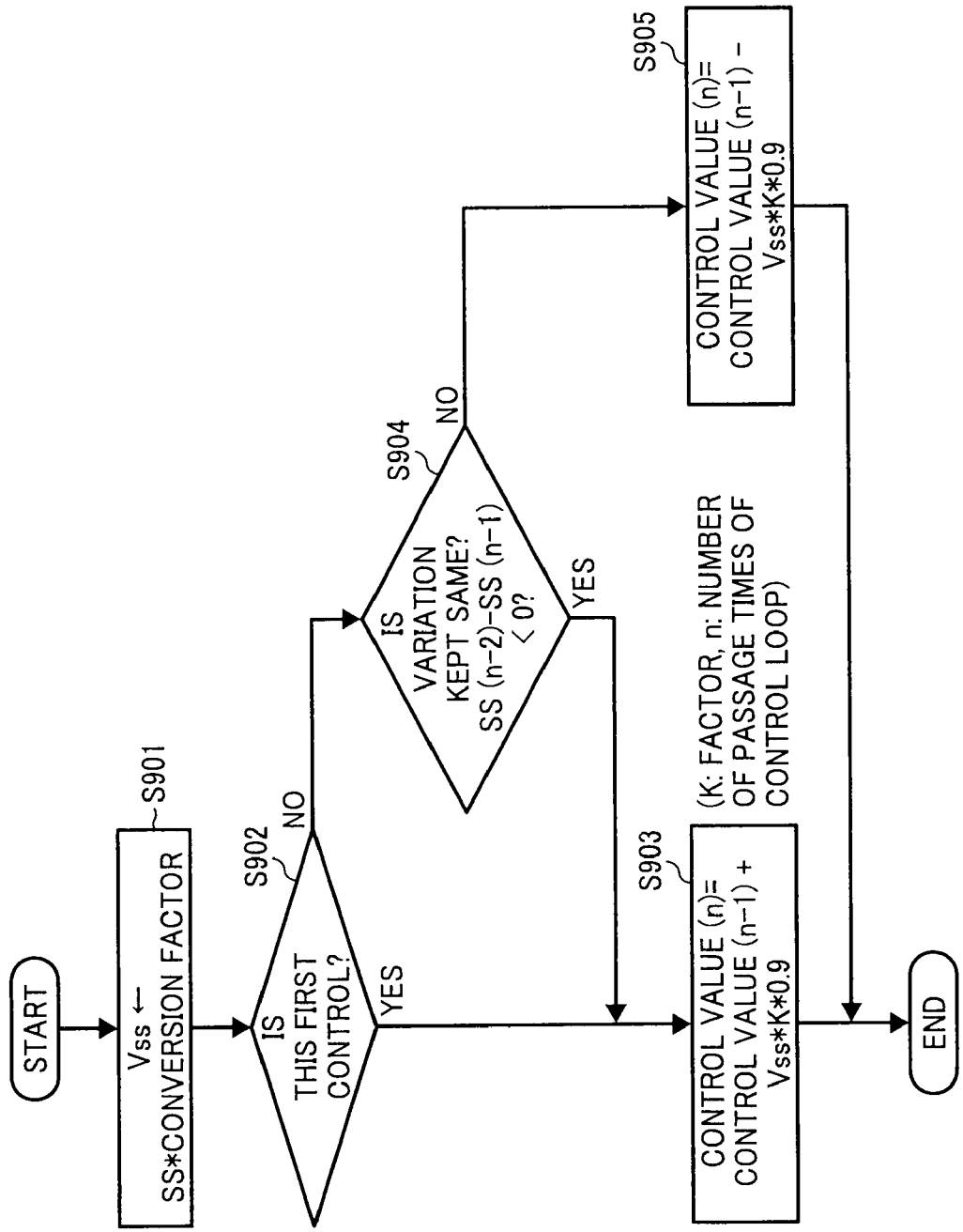
FIG. 28 is a flowchart of a control procedure for amplitude increase/decrease process when it is known that image data is equivalent to how many millivolts of the image signal.
Figure 29:
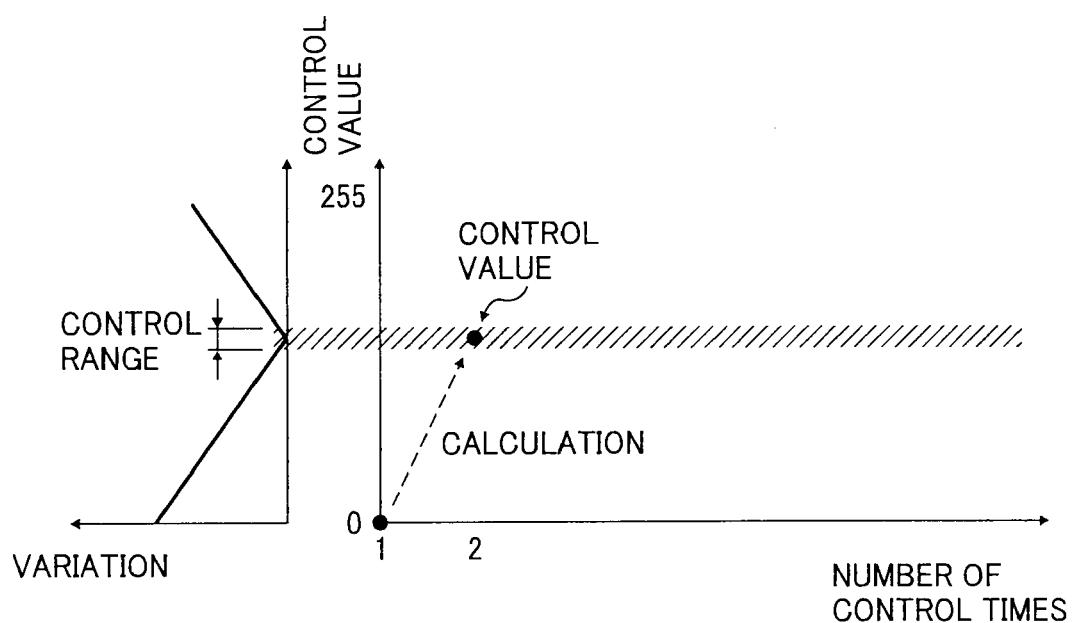
FIG. 29 is a diagram of how the amplitude is controlled when the process is performed according to the flowchart of FIG. 28.

Moreover, if it is known that 1-digit image data is equivalent to an AFE input or to how many millivolts of an image signal, the amplitude control value can be determined from the detected variation through calculation, and at this time, the calculation requires only once as the least number of times. FIG. 28 is a flowchart of a procedure for the process at this time, and FIG. 29 is a diagram of how the amplitude is controlled when the process is performed according to the procedure in FIG. 28.

In the flowchart of FIG. 28, first, a variation (SS) is detected. Then, in the amplitude increase/decrease process, the detected variation is detected as a voltage through the following equation (Step S901):

$$Vss(\text{mV}) = SS(\text{digit}) * \text{conversion factor}(\text{mV/digit}),$$

degradation of the variation is considered (Step S904) according to the number of control times (Step S902), the variation is converted to an image signal level, and the control value is set by the following equation (Steps S903 and S905):

$$\text{Control value}(n) = \text{Control value}(n-1) \pm Vss * K * \text{follow-up degree}(0.9)$$

(k: factor, and n: number of passage times of control loop).

The conversion factor is a factor indicating how many millivolts per 1-digit image data, and k is a factor for converting the conversion factor to an amplitude control value (here, DAC_CODE). The follow-up degree includes values of 0 to 1, which determine a control speed, however, if the value is too large, then the control itself is not finished, and thus, an appropriate value needs to be set. Therefore, the follow-up degree is set to 0.9 in the embodiment.

When the variation of the image signal itself is detected, the amplitude control value is simply corrected by setting a value in which the variation is added to the control value set so far. However, when the variation degraded due to superimposition of the modulation signal on the image signal is detected, this means that the correction is excessively performed. Thus, a value obtained by subtracting the variation from the control value needs to be set as a control value. Therefore, in the flowchart of FIG. 28, it is determined at Step S904 whether the variation is degraded by the amplitude control or whether the variation is kept the same, and a method of setting the control value is changed depending on the result.

As explained above, by directly determining the amplitude control value through the calculation, it can also be obtained by one calculation, so that the control time can further be reduced. The control state at this time is shown in FIG. 29. It is understood that the control value falls within the control range with one control.

Figure 30A:
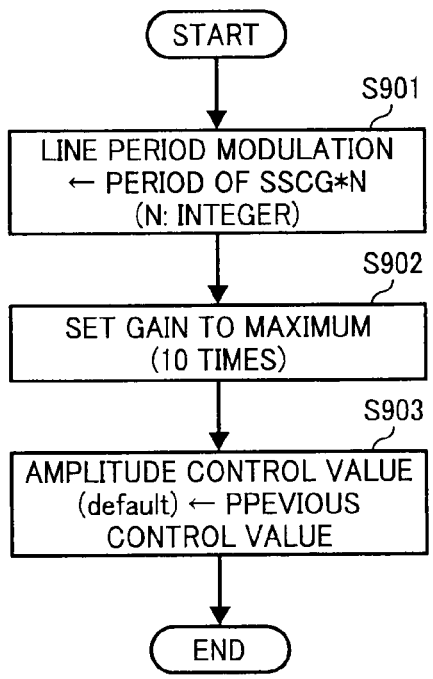
FIGS. 30A to 30C are flowcharts of control procedures for setting a default of an amplitude control value as a previous control value to control an amplitude and for automatically controlling the amplitude of the modulation signal.
Figure 30B:
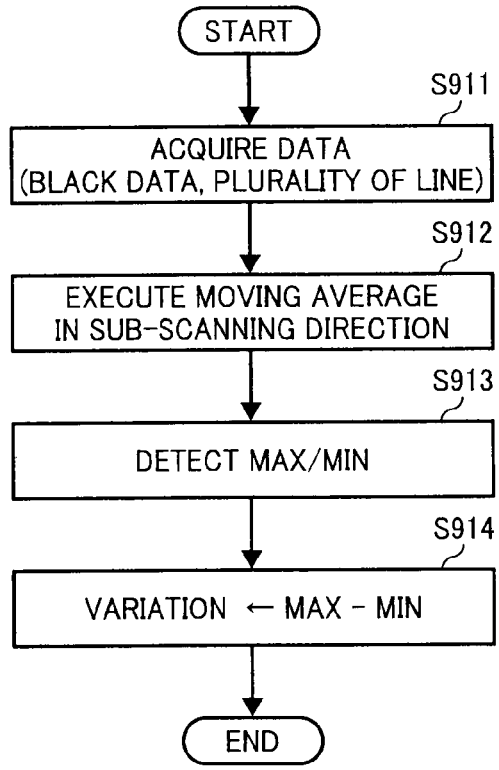
Figure 30C:
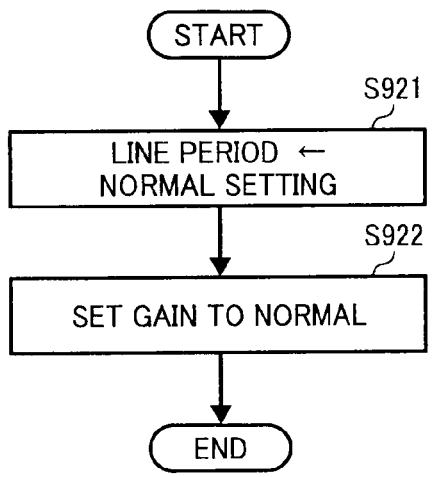

In this example, the default of the amplitude control value is set to 0 as shown in FIG. 29. However, by storing a result of previous control and setting the result as the default for the amplitude control, the process does not have to pass through the control loop if the control result is the same as the previous one, and thus the control time can be reduced. FIGS. 30A to 30C are flowcharts of control procedures for controlling an amplitude using the previous control value as the default of the amplitude control value.

In FIGS. 30A to 30C, the line period is set to an integral multiple of the modulation period of the SSCG upon the initial setting (Step S901), and the gain is set to the maximum (10 times) (Step S902). Subsequently, the previous control value is set as the amplitude control value (Step S903). Thereafter, similarly to the flowchart of FIG. 21B, in the detection of the variation, a plurality of lines of black data are acquired (Step S911), averaging in the sub-scanning direction is performed (Step S912), a maximum value MAX and a minimum value MIN of the black data after being averaged are detected (Step S913), and a difference MAX–MIN of the main-scanning black data after being averaged is detected as a variation (Step S914). Lastly, in the post-processing setting, the line period is returned to the normal setting (Step S921), and the gain is returned to the normal setting (Step S922). Thus, even if the modulation period of the SSCG 2 is asynchronous to the line period, effect of noise can be largely reduced, so that the process of detecting the variation can easily be executed. The time required for the control can be further reduced than that of the control procedure in FIG. 28. The flowchart of FIG. 30A is one obtained by adding a process of setting the previous control value as the amplitude control value to the routine of the initial setting in the flowchart of FIG. 23A.

Figure 31:
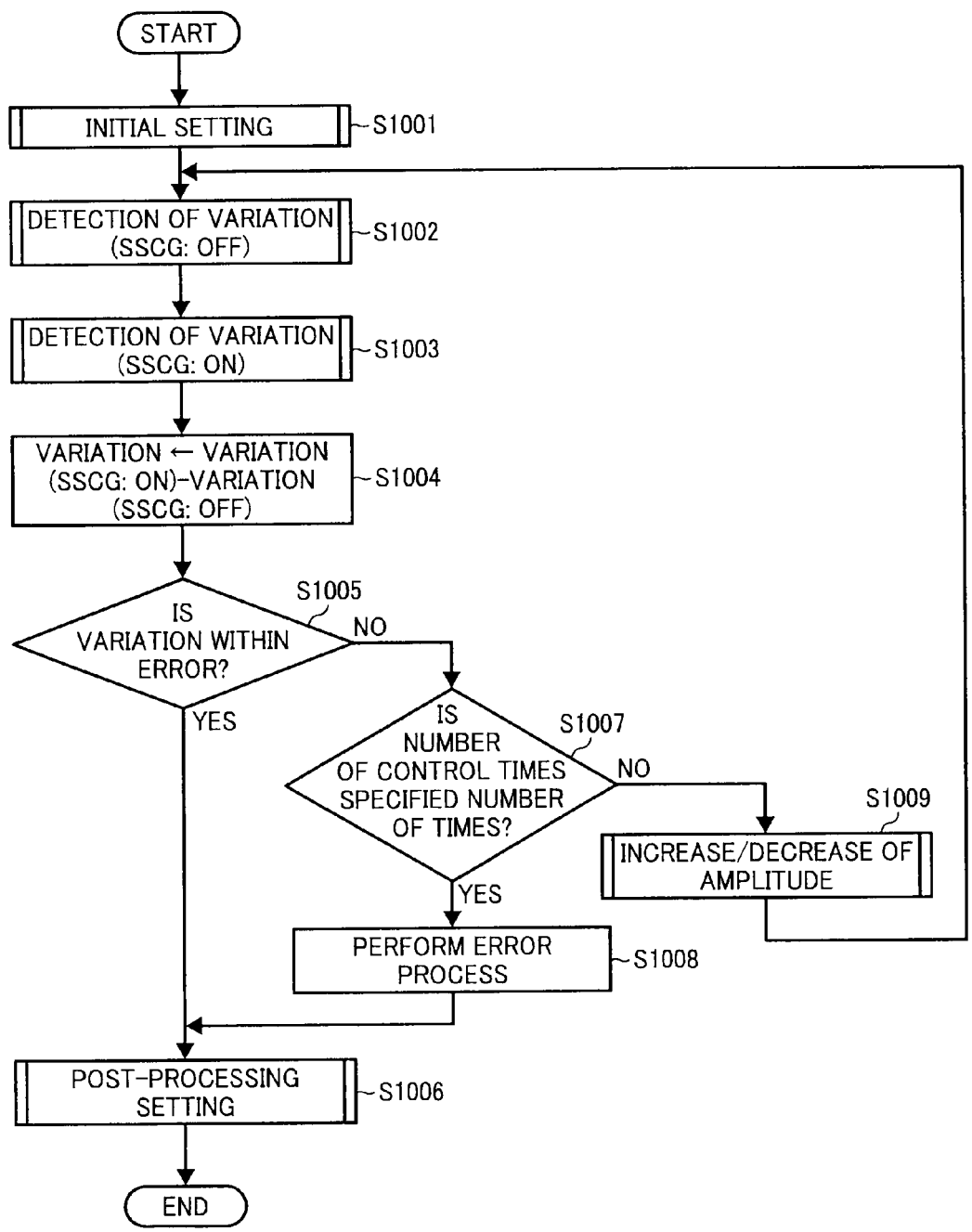
FIG. 31 is a flowchart of a control procedure for adding a variation detection process upon OFF of SSCG and a process of defining a difference between variations upon OFF/ON of the SSCG as a new variation, to the flowchart of FIG. 14.

Meanwhile, when the power supply varies in voltage, there is sometimes a case in which the variation due to the SSCG 2 is erroneously detected and automatic control is not thereby well performed. A process of eliminating the erroneous detection of the SSCG 2 is performed against this trouble. FIG. 31 is a flowchart of a control procedure for eliminating the erroneous detection of the SSCG 2 and automatically controlling the amplitude. As shown in this flowchart, first, the initial setting is performed (Step S1001), then, a variation when the SSCG 2 is stopped (OFF) is detected (Step S1002). Thereafter, the SSCG 2 is activated (ON) and a variation is detected (Step S1003). Here, a difference between the variations when the SSCG 2 is ON and OFF is set as a variation (Step S1004), and it is checked whether the variation is within the error (Step S1005). If the variation falls within the error, the post-processing setting is performed (Step S1006), and the process is ended.

Meanwhile, if the variation is not within the error, the number of control times is checked (Step S1007). If the number of control times does not reach the specified number of times, the amplitude increase/decrease process is executed (Step S1009), and the processes after Step S1003 are repeated. If the number of control times reaches the specified number of times, the error process is performed (Step S1008), and after the post-processing setting is performed (Step S1006), the process is ended.

By performing the processes in the above manner, the effect of the variation in the power supply can be cancelled out, so that only the variation due to the SSCG 2 can be detected. As a result, the erroneous detection can be prevented. The processes for detecting the variation (SSCG: OFF/ON) at Steps S1002 and S1003 may be performed using the method of detecting the variation used so far. The flowchart of FIG. 31 is one obtained by adding the process of detecting the variation when SSCG: OFF and the process of defining a difference between variations when SSCG: OFF/ON as a new variation, to the flowchart of FIG. 16.

Furthermore, the variation is detected using the black data (dark), however, when a pressure plate of the scanner or an automatic document feeder (ADF) is opened, light may enter the CCD 4, which may cause the control to be failed. Therefore, when the pressure plate or the ADF is opened, the previous control value is set as the amplitude control value or the setting is performed so as not to superimpose the modulation signal on the image signal.

Figure 32:
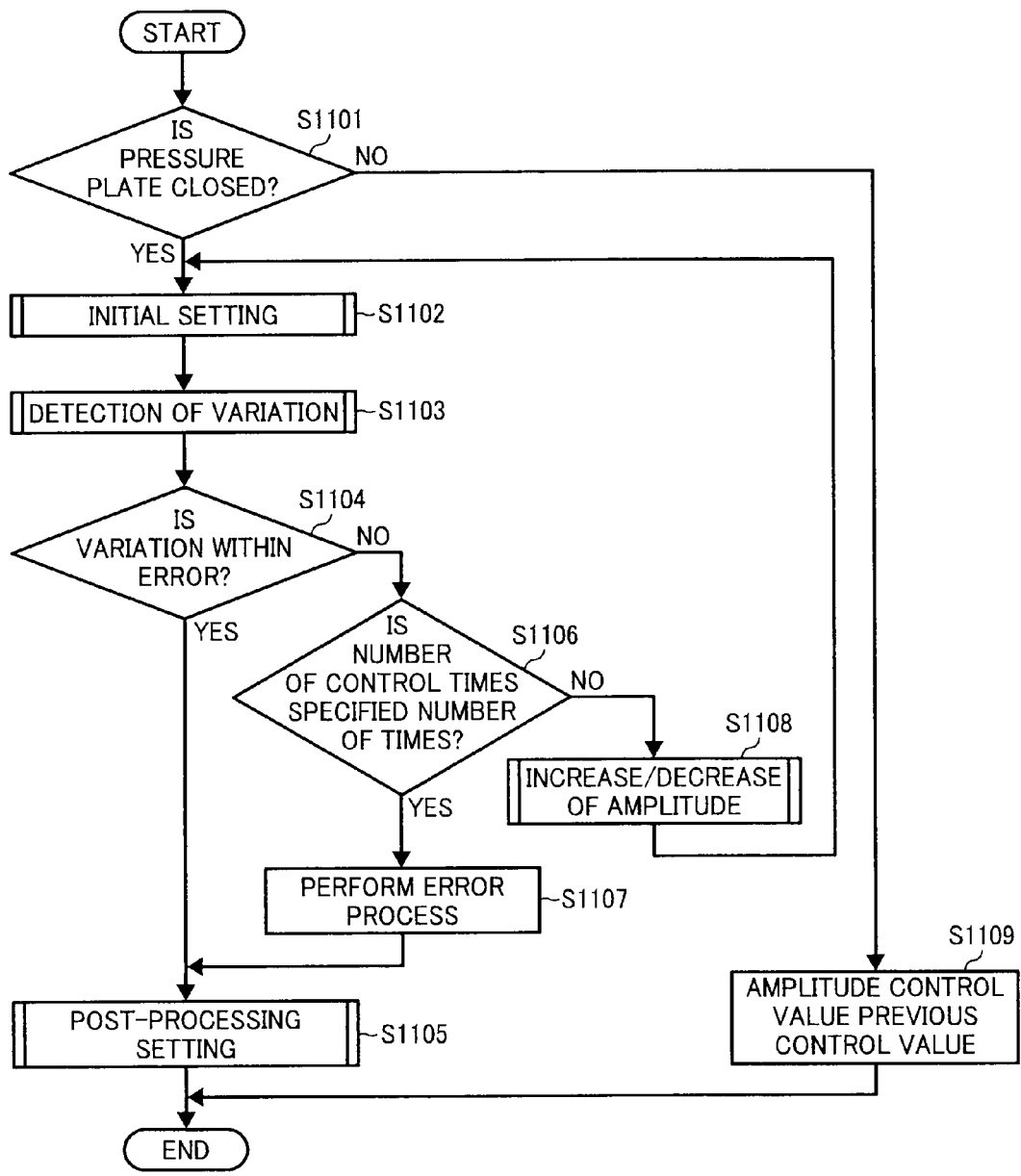
FIG. 32 is a flowchart of a control procedure for checking an open/close of a pressure plate and controlling the amplitude.

FIG. 32 is a flowchart of a control procedure for checking an open/close of a pressure plate and controlling an amplitude. In FIG. 32, when the process is started, first, it is checked whether the pressure plate is closed (Step S1101), then when it is closed, the initial setting is performed before the control (Step S1102). A variation due to frequency modulation is detected (Step S1103), and it is determined whether the variation is within the error (Step S1104). If it is within the error, then the setting is returned as required for a next control process (post-processing setting: Step S1105), and the automatic control is ended. If the variation is outside the error, then it is checked whether the number of control times is a specified number of times (Step S1106). If the number of control times reaches the specified number of times, after an error process is performed (Step S1107), the post-processing setting is performed (Step S1105), and the process is ended. If the number of control times does not reach the specified number of times, the amplitude is changed (Step S1108), the process returns to Step S1103, and the variation is again detected and determined. If the pressure plate is not closed at Step S1101, then the previous control value is set as the amplitude control value (Step S1109), and the process is ended.

The flowchart of FIG. 32 is one obtained by adding the process for setting the previous control value as the amplitude control value when the pressure plate is opened, to the flowchart of FIG. 16.

Figure 33:
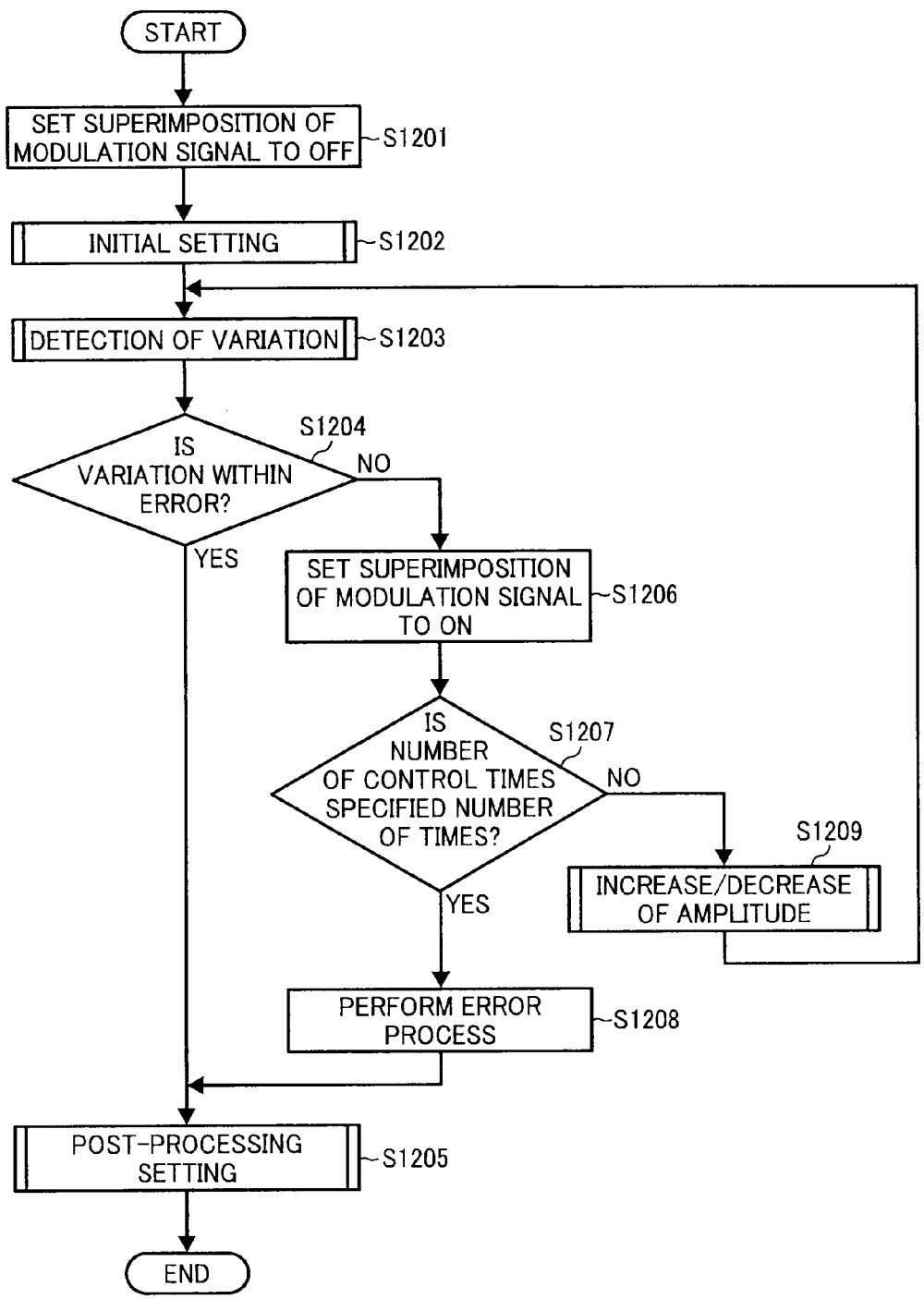
FIG. 33 is a flowchart of a control procedure for reading a variation in a state in which the modulation signal is not superimposed on the image signal and automatically controlling the amplitude of the modulation signal.

As explained above, the variation due to the SSCG 2 largely varies, and there may be some in which variation does not occur. In this case, the variation may be worsened due to superimposition of the modulation signal on the image signal, or the amplitude control may be failed. This problem can be easily dealt with by checking a variation in a state in which the modulation signal is not superimposed thereon and the amplitude control is finished when the variation falls within the control range. FIG. 33 is a flowchart of a control procedure for dealing with this problem.

In FIG. 33, first, the superimposition of the modulation signal is set to OFF (Step S1201), then the initial setting is performed before the control (Step S1202). A variation due to frequency modulation is detected (Step S1203), and it is determined whether the variation is within the error (Step S1204). If it is within the error, then the setting is returned as required for a next control process (post-processing setting: Step S1205), and the automatic control is ended. If the variation is outside the error, then the superimposition of the modulation signal is set to ON (Step S1206), and it is checked whether the number of control times is the specified number of times (Step S1207). If the number of control times reaches the specified number of times, after the error process is performed (Step S1208), the post-processing setting is performed (Step S1205), and the process is ended. If the number of control times does not reach the specified number of times, the amplitude is changed (Step S1209), the process returns to Step S1203, and the variation is again detected and determined.

It should be noted that the flowchart of FIG. 33 is one obtained by adding the setting of invalidating the superimposition of the modulation signal and the setting of validating the superimposition when the variation upon the invalidation of superimposition of the modulation signal is not within the error, to the flowchart of FIG. 16.

4. Device Provided With Amplitude Control Function

Figure 34:
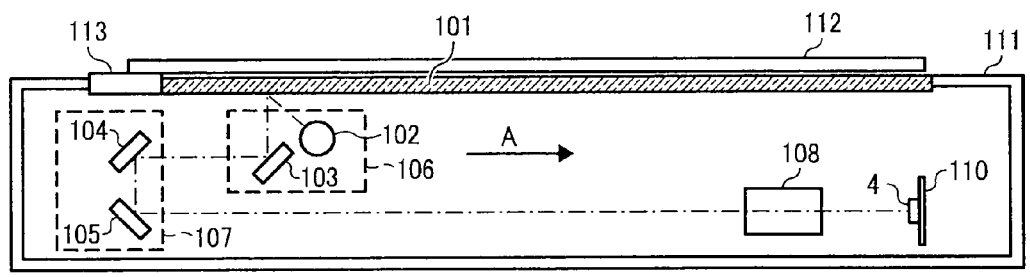
FIG. 34 is a schematic of a hardware configuration of an image reading device (scanner) according to the embodiment.

FIG. 34 is a schematic of a hardware configuration of an image reading device (scanner 111) according to the embodiment. The scanner 111 is a flat-bed type that includes a contact glass 101 for setting thereon an original provided on the upper surface of a body thereof. Arranged below the contact glass 101 are a first carriage 106 and a second carriage 107 so as to move in an arrow A direction (sub-scanning direction) at a speed of 2:1. A halogen lamp 102 as a light source and a first mirror 103 are incorporated in the first carriage 106, and a second mirror 104 and a third mirror 105 are incorporated in the second carriage 107. A light irradiated by the halogen lamp 102 is reflected by the original, and the reflected light from the original is reflected by the first mirror 103, the second mirror 104, and the third mirror 105, to enter an imaging lens 108. The incident light is converged to the imaging lens 108, and an image is formed on an image plane of the CCD (linear image sensor) 4. An analog electrical signal photoelectrically converted by the CCD (linear image sensor) 4 is converted to a digital electrical signal by a sensor board 110, and is sent to a subsequent stage. The reason that the first carriage 106 and the second carriage 107 move in the sub-scanning direction at a speed of 2:1 is because an optical path length from the surface of an original to the image plane of the CCD 4 is kept at a constant value. The CCD 4 is placed on the sensor board 110.

Moreover, a pressure plate 112 that is openable and closable is provided so as to cover the upper surface of the contact glass 101. Thus, when an original is set on the contact glass 101, an external light is prevented from entering the CCD 4. An ADF or an automatic reversing document feeder (ARDF) is provided instead of the pressure plate 112 so as to enable automatic feeding of the original.

Figure 35:
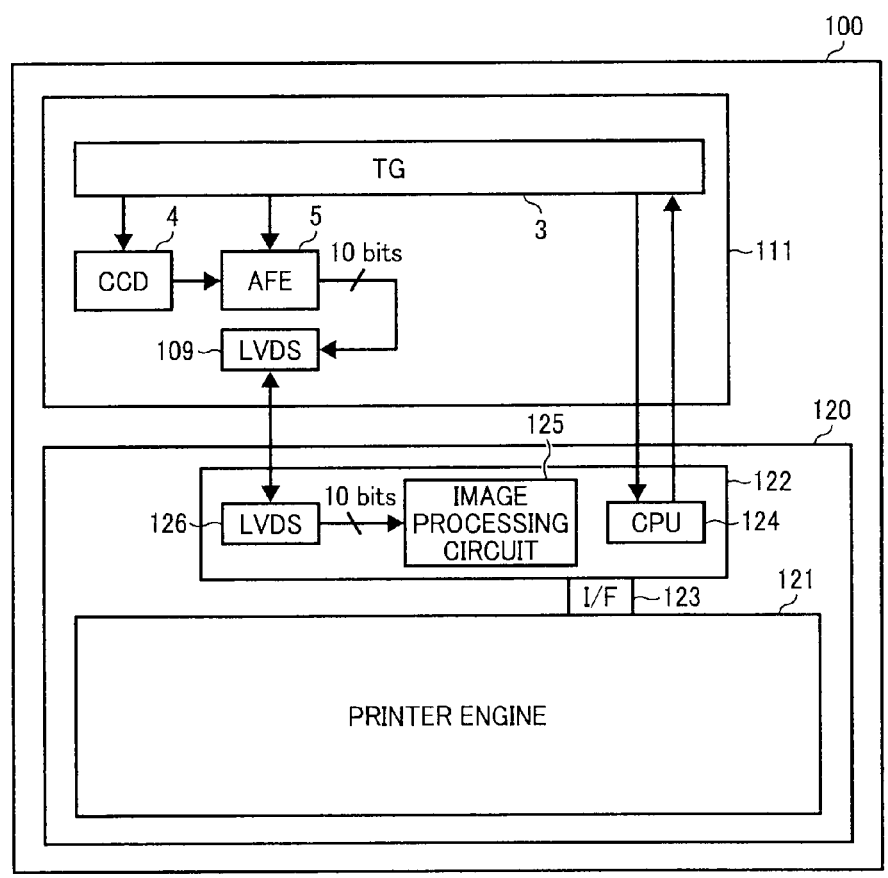
FIG. 35 is a diagram of a schematic configuration of an image forming apparatus provided with the scanner shown in FIG. 34.

FIG. 35 is a diagram of a schematic configuration of the image forming apparatus provided with the scanner shown in FIG. 34. The image forming apparatus 100 includes the scanner 111 and a printer 120. The scanner 111 includes the TG 3, the CCD (image sensor) 4, and the AFE 5. A 10-bit DOUT signal is sent from the AFE 5 to a low voltage differential signaling (LVDS) 109. The control circuit of the scanner 111 is as explained in the examples or in the conventional examples.

Meanwhile, the printer 120 includes a printer engine 121 and a controller 122 that controls the printer engine 121, which are connected to each other through an interface (I/F) 123. The controller 122 includes a central processing unit (CPU) 124, an image processing circuit 125, and LVDS 126. The CPU 124 is mutually, communicably connected to the TG 3, controls the printer engine 121 based on the image signal received through the LVDS 126, and forms an image on a recording paper. There are various types of image forming processes for the printer engine 121, and the processes can be used in any type of printer engines, and thus, explanation of the printer engine is omitted.

The CPU 124 can control components so as to be processed along any one of the control procedures shown in the flowcharts of the examples. At this time, the program shown in the flowchart is stored in read only memory (ROM) (not shown), and the CPU 124 reads the program stored in the ROM to be expanded in a random access memory (RAM) (not shown), and executes the program while the RAM is used as a work area.

The program is written to a recording medium such as a flexible disk (FD), a compact disk (CD), and a digital versatile disk (DVD). The program is used by being read from the recording medium and thereby downloaded or being downloaded through a network.

As explained above, the embodiment has the effects as follows:

1) The amplitude of the modulation signal detected by the amplitude controller 11 can be controlled. Therefore, the amplitude of the modulation signal is changed according to the variation due to the SSCG 2, and the variation due to the SSCG 2 is appropriately corrected even if there are individual differences (variations), so that it is possible to robustly provide a high-quality read image free from the stripes.

2) The amplitude controller 11 can easily perform the amplitude control on the modulation signal by using the multiplication DAC that changes the amplitude.

3) The amplitude controller 11 variably controls the resistor or the capacitor, or variably controls the amplitude based on the PWM signal. Therefore, the amplitude controller 11 can easily perform the amplitude control even if the frequency of the modulation signal is high.

4) The amplifier that amplifies the modulation signal is provided, and therefore the noise resistance can be increased.

5) The phase of the modulation signal is inverted to be superimposed on the image signal, and therefore the variation can be appropriately corrected even if the polarity of the modulation signal is different from the polarity of the variation of the image signal.

6) After the modulation signal is buffered, it is superimposed on the image signal, and therefore degradation in the frequency characteristic of the modulation signal can be prevented.

7) Whether or not the modulation signal is superimposed on the image signal can be selected, and therefore it is possible to prevent degradation of the variation due to correction when the variation does not occur.

8) The modulation signal is detected from the loop filter of the PLL circuit 3a in the TG 3, and therefore a temporal profile of the frequency modulation can be easily detected.

9) The image reading device that can control the amplitude of the modulation signal is provided in the image forming apparatus. Therefore, high-quality printed images free from stripes can be robustly provided.

10) It is possible to determine whether the variation occurring in the image signal is within a preset range. Therefore, an optimal correction can be automatically performed for each component.

11) A difference between the maximum value and the minimum value of the black-level main-scanning data having been subjected to the moving average process in the main scanning direction is detected as a variation. Therefore, even if the modulation period of the SSCG 2 is asynchronous to the line period, the effect of noise is reduced and the variation can be detected.

12) The maximum value and the minimum value of the black-level main-scanning data are detected as a difference. Therefore, even if the modulation period of the SSCG 2 is asynchronous to the line period, the effect of noise is largely reduced and the variation can be detected.

13) The gain applied to the image signal is increased more than a normal time. Therefore, even if the variation is small with respect to the resolution of the image data, the variation can be appropriately detected.

14) When the amplitude is to be increased or decreased, a target amplification control value is detected and a center value of the detected range is set to a value for amplitude control, or the detected variation is converted to an amplitude level of the modulation signal and the amplitude level is set as the amplitude control value. Furthermore, the default of the amplitude control value is set as the previous control value. Therefore, the time required for the control can be reduced.

15) A difference between a variation in a state in which the frequency is modulated and a variation in a state in which the frequency is not modulated is detected as the variation. Therefore, even if the effect such as variation in the power supply is exerted on the variation, the variation can be appropriately controlled.

16) If an original is read when the pressure plate or the ADF is opened, the previous control value is set as the amplitude control value, or setting is performed so as not to superimpose the modulation signal on the image signal. Therefore, erroneous control can be prevented when appropriate amplitude control cannot possibly be performed.

17) When the control is not required (there is no variation in the SSCG), it is possible to prevent that the control is not appropriately performed or that the variation is degraded caused by the control.

According to an aspect of the present invention, by controlling the amplitude of the detected modulation signal, the variation due to the SSCG is appropriately corrected even if there are individual differences (variations), so that high-quality images free from stripes can be output without being affected by disturbance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising;
   a photoelectric conversion device that receives a light reflected from an original and converts received light to an image signal;
   a timing generator that outputs a frequency-modulated clock;
   a modulation signal detector that detects and outputs a modulation signal being a signal corresponding to a change in frequency of the frequency-modulated clock;
   an amplitude controller that controls an amplitude of the modulation signal output from the modulation signal detector thereby generating an amplitude-controlled modulation signal and outputs the amplitude-controlled modulation signal; and
   a signal combining unit that superimposes the amplitude-controlled modulation signal on the image signal,
   wherein the amplitude controller is formed with a multiplication digital-to-analog converter (DAC).

2. The image reading device according to claim 1, wherein the signal combining unit is an image processing circuit provided in a subsequent stage of the amplitude controller, and sets the amplitude-controlled modulation signal as a signal reference potential of the image processing circuit.

3. The image reading device according to claim 1, wherein the amplitude controller includes any one of an electrically controllable resistor and capacitor that controls the amplitude of the modulation signal.

4. An image reading device comprising:
   a photoelectric conversion device that receives a light reflected from an original and converts received light to an image signal;
   a timing generator that outputs a frequency-modulated clock;
   a modulation signal detector that detects and outputs a modulation signal being a signal corresponding to a change in frequency of the frequency-modulated clock;
   an amplitude controller that controls an amplitude of the modulation signal output from the modulation signal detector thereby generating an amplitude-controlled modulation signal and outputs the amplitude-controlled modulation signal; and
   a signal combining unit that superimposes the amplitude-controlled modulation signal on the image signal,
   wherein the amplitude controller includes
   a switch unit that allows or does not allow the modulation signal to pass based on a pulse-width modulation (PWM) signal; and
   a low-pass filter that receives the modulation signal from the switch unit, controls an amplitude of the modulation signal thereby generating the amplitude-controlled modulation signal and outputs the amplitude-controlled modulation signal.

5. The image reading device according to claim 1, wherein the amplitude controller includes an amplifier that amplifies detected modulation signal.

6. The image reading device according to claim 1, wherein the signal combining unit inverts a phase of the amplitude-controlled modulation signal thereby obtaining a phase-inverted modulation signal and superimposes the phase-inverted modulation signal on the image signal.

7. An image reading device comprising:
   a photoelectric conversion device that receives a light reflected from an original and converts received light to an image signal;
   a timing generator that outputs a frequency-modulated clock;
   a modulation signal detector that detects and outputs a modulation signal being a signal corresponding to a change in frequency of the frequency-modulated clock;
   an amplitude controller that controls an amplitude of the modulation signal output from the modulation signal detector thereby generating an amplitude-controlled modulation signal and outputs the amplitude-controlled modulation signal;
   a signal combining unit that superimposes the amplitude-controlled modulation signal on the image signal; and
   a buffer provided in a subsequent stage of the amplitude controller that buffers the amplitude-controlled modulation signal output from the amplitude controller,
   wherein the signal combining unit superimposes the amplitude-controlled modulation signal buffered in the buffer on the image signal.

8. The image reading device according to claim 1, further comprising a changeover unit that changes a process as to whether the amplitude-controlled modulation signal is superimposed on the image signal.

9. The image reading device according to claim 1, wherein the timing generator includes any one of a phase locked loop (PLL) circuit and a delay looked loop (DLL) circuit that outputs the frequency-modulated clock.

* * * * *